United States Patent
Sucich et al.

(10) Patent No.: US 12,533,749 B2
(45) Date of Patent: Jan. 27, 2026

(54) METHODS FOR TAILORING THE MAGNETIC PERMEABILITY OF SOFT MAGNETS, AND SOFT MAGNETS OBTAINED THEREFROM

(71) Applicant: HRL Laboratories, LLC, Malibu, CA (US)

(72) Inventors: Amber Sucich, Calabasas, CA (US); Eric Clough, Santa Monica, CA (US); Brennan Yahata, Santa Barbara, CA (US); Darby Laplant, Ventura, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 18/673,653

(22) Filed: May 24, 2024

(65) Prior Publication Data

US 2024/0308002 A1     Sep. 19, 2024

Related U.S. Application Data

(63) Continuation of application No. 18/102,905, filed on Jan. 30, 2023, now Pat. No. 12,023,759.
(Continued)

(51) Int. Cl.
*H01F 1/147* (2006.01)
*B22F 10/28* (2021.01)
(Continued)

(52) U.S. Cl.
CPC ............ *B23K 26/342* (2015.10); *B22F 10/28* (2021.01); *B33Y 10/00* (2014.12); *H01F 1/147* (2013.01); *B22F 2998/10* (2013.01)

(58) Field of Classification Search
None
See application file for complete search history.

(56) References Cited

U.S. PATENT DOCUMENTS 8,400,038 B2   3/2013   Smith et al.
9,715,957 B2   7/2017   Wang et al.
(Continued)

OTHER PUBLICATIONS

Bodziony et al., "Magnetic Study of Nanocrystalline TiB2, TiC, B4C Powders Doped to AISI 316L Austenitic Steel", Acta Physica Polonica A, No. 1, vol. 132, pp. 62-67 (2017).
(Continued)

*Primary Examiner* — Mary I Omori
(74) *Attorney, Agent, or Firm* — O'Connor & Company; Ryan P. O'Connor

(57) ABSTRACT

Some variations provide a method of tailoring the surface of a soft magnet, comprising: depositing an austenite-phase-stabilizing donor material on one or more first surface regions of a ferromagnetic receiver material; not depositing the austenite-phase-stabilizing donor material on one or more second surface regions of the ferromagnetic receiver material; laser melting the austenite-phase-stabilizing donor material into the first surface regions; and solidifying the molten austenite-phase-stabilizing donor material within the first surface regions, thereby selectively alloying the ferromagnetic receiver material in the first surface regions. Laser ablation may be utilized instead of laser melting. The first surface regions have a significantly higher magnetic permeability, following the selective alloying of the donor material, compared to the second surface regions. Soft magnets with surface-tailored magnetic permeability are provided by this technology, which is demonstrated using several examples. One commercial application is selectively alloyed soft magnets for a rotor in an electric motor.

9 Claims, 11 Drawing Sheets

Related U.S. Application Data

(60) Provisional application No. 63/329,535, filed on Apr. 11, 2022.

(51) Int. Cl.
*B23K 26/342* (2014.01)
*B33Y 10/00* (2015.01)

(56) References Cited

U.S. PATENT DOCUMENTS

| | | |
|---|---|---|
| 10,269,479 B2 | 4/2019 | Simon et al. |
| 10,692,635 B2 | 6/2020 | Wang et al. |
| 2006/0177702 A1 | 8/2006 | Ajan |
| 2012/0021219 A1 | 1/2012 | Gabay et al. |
| 2016/0133369 A1 | 5/2016 | Loginov et al. |
| 2016/0307678 A1 | 10/2016 | Unosson et al. |
| 2017/0154713 A1* | 6/2017 | Simon ................ B23K 26/0006 |
| 2017/0187258 A1 | 6/2017 | Fujikawa et al. |
| 2022/0037944 A1* | 2/2022 | Fatemi ................... H02K 7/006 |
| 2022/0341020 A1* | 10/2022 | Huang ...................... C23C 8/26 |

OTHER PUBLICATIONS

Lamichhane et al., "Additive manufacturing of soft magnets for electrical machines—a review", Materials Today Physics 15, 100255 (2020).

\* cited by examiner

METHODS FOR TAILORING THE MAGNETIC PERMEABILITY OF SOFT MAGNETS, AND SOFT MAGNETS OBTAINED THEREFROM

PRIORITY DATA

This patent application is a continuation application of U.S. patent application Ser. No. 18/102,905, filed on Jan. 30, 2023, which claims priority to U.S. Provisional Patent App. No. 63/329,535, filed on Apr. 11, 2022, each of which is hereby incorporated by reference herein.

FIELD OF THE INVENTION

The present invention generally relates to methods for tailoring magnetic properties in soft magnets, and magnetic structures obtained therefrom.

BACKGROUND OF THE INVENTION

A magnet is a material or object that produces a magnetic field. The magnetic field creates a force that acts on other magnets or ferromagnetic materials, such as iron, steel, nickel, or cobalt. A permanent magnet is an object made from a material that is magnetized and creates its own persistent magnetic field. Applications of permanent magnets include, but are not limited to, electric vehicle motors, electric take-off assist motors and sensors, magnetic separators, and magnetic detectors.

Some ferromagnetic materials are magnetically soft materials ("soft magnets") such as annealed iron. Soft magnets can be magnetized but do not tend to stay magnetized. On the other hand, magnetically hard materials ("hard magnets") are typically difficult to demagnetize. Hard magnets have high magnetic coercivity, while soft magnets have relatively low magnetic coercivity. Applications of soft magnets include transformer cores, motors, generators, inductors, and electromagnets.

Most modern electric machines employ magnetically permeable, soft ferromagnetic materials such as steel or magnetic iron in geometries for guiding the magnetic fields and providing an effective medium for energy transfer. A common magnetic material used for this purpose is stacked laminations of thin sheets of non-oriented electrical steel. Functional soft magnetic materials for motors are typically alloys of ferrosilicon (FeSi).

To improve magnetic properties, soft magnetic materials may be alloyed with other materials and heat-treated to optimize microstructures. This process introduces defects, grain boundaries, and impurities that hinder magnetic domain wall movement and significantly impair magnetic properties. The conventional process utilizes computer-aided design of the machine core to develop special precision tooling for cutting and punching dies for purposes of mold forming and stamping. FeSi sheets are then cold-rolled to the required thickness for lamination and cut to required dimensions. The sheets are coated with insulating material that resists the flow of eddy currents. Stamping and punching are then done to shape the sheets to the desired geometry. The sheets are then stacked on an aligning fixture by pinning or welding. The stacks may require post-machining and heat treatments to prevent deterioration from stresses caused by stamping, welding, and interlocking. In a conventional process, several laminations are individually stamped, stacked, measured, machined, and finished in separate processes. As a result, labor and production times can be significant.

New or improved methods, structures, and systems are desired for tailoring magnetism in soft magnetic materials. Current masking and bulk nitriding efforts are limited to low-saturation alloys. The state-of-the-art method requires masking and de-masking the surface of a heat-resistant varnish. Masking and demasking is labor-intensive, and is not quickly repeatable.

There is a desire for a scalable, low-cost process to selectively alloy the magnetic surface of a rotor, which is a critical component of an electromagnetic system such as an electric motor, electric generator, or alternator. Generally, methods are needed to tailor the behavior of a soft magnetic material.

SUMMARY OF THE INVENTION

The present invention addresses the aforementioned needs in the art, as will now be summarized and then further described in detail below.

Some variations provide a method of tailoring the surface of a soft magnetic material, the method comprising:
 (a) providing a selected ferromagnetic receiver material;
 (b) providing a selected austenite-phase-stabilizing donor material;
 (c) depositing the selected austenite-phase-stabilizing donor material on one or more first surface regions of the ferromagnetic receiver material;
 (d) not depositing the selected austenite-phase-stabilizing donor material on one or more second surface regions of the ferromagnetic receiver material;
 (e) laser melting the selected austenite-phase-stabilizing donor material into the one or more first surface regions, to form molten austenite-phase-stabilizing donor material; and
 (f) solidifying the molten austenite-phase-stabilizing donor material, to form solid austenite-phase-stabilizing donor material that is situated within the one or more first surface regions, thereby selectively alloying the ferromagnetic receiver material in the one or more first surface regions,
 wherein the one or more first surface regions are characterized by a first average magnetic permeability following the selective alloying in step (f),
 wherein the one or more second surface regions are characterized by a second average magnetic permeability, and
 wherein the first average magnetic permeability is higher than the second average magnetic permeability.

In some embodiments, the method does not employ a mask. In some embodiments, the method does not employ a chemical treatment.

In some methods, the austenite-phase-stabilizing donor material is deposited in step (c) as powder particles. Alternatively, or additionally, the austenite-phase-stabilizing donor material may be deposited in step (c) as a film, foil, or mesh.

In some methods, the selected ferromagnetic receiver material is selected from the group consisting of FeSi, FeNi, FeCo, NiCo, FeSiAl, and combinations thereof.

In some methods, the selected austenite-phase-stabilizing donor material is selected from the group consisting of Ni, Mn, Co, Cr, Si, Mo, Nb, Ti, Mg, Cu, Al, N, C, B, and combinations thereof.

In step (c), the selected austenite-phase-stabilizing donor material may be deposited on the one or more first surface regions using slurry coating, laser cladding, electron beam cladding, electroplating, electroless plating, wire arc deposition, chemical vapor deposition, physical vapor deposition, thermal spraying, plasma spraying, or a combination thereof, for example.

Following step (f), the one or more first surface regions may have an average thickness from about 1 micron to about 3000 microns, for example. In certain embodiments, the average thickness is from about 100 microns to about 500 microns.

In some methods, the first average magnetic permeability is at least 90% higher than the second average magnetic permeability. In certain embodiments, the first average magnetic permeability is at least 99% (such as at least 99.9% or at least 99.99%) higher than the second average magnetic permeability.

The soft magnetic material may be present in a rotor in an electric motor, for example.

Other variations provide a method of tailoring the surface of a soft magnetic material, the method comprising:
(a) providing a selected ferromagnetic receiver material;
(b) providing a selected austenite-phase-stabilizing donor material;
(c) depositing the selected austenite-phase-stabilizing donor material on one or more first surface regions of the ferromagnetic receiver material;
(d) not depositing the selected austenite-phase-stabilizing donor material on one or more second surface regions of the ferromagnetic receiver material; and
(e) laser ablating the selected austenite-phase-stabilizing donor material into the one or more first surface regions, to force the selected austenite-phase-stabilizing donor material to penetrate into the one or more first surface regions, thereby selectively alloying the ferromagnetic receiver material in the one or more first surface regions,
wherein the one or more first surface regions are characterized by a first average magnetic permeability,
wherein the one or more second surface regions are characterized by a second average magnetic permeability, and
wherein the first average magnetic permeability is higher than the second average magnetic permeability.

In some embodiments employing laser ablation, the method does not employ a mask, a chemical treatment, or either of these.

In some methods, the selected austenite-phase-stabilizing donor material is deposited in step (c) as powder particles.

The selected ferromagnetic receiver material may be selected from the group consisting of FeSi, FeNi, FeCo, NiCo, FeSiAl, and combinations thereof.

The selected austenite-phase-stabilizing donor material may be selected from the group consisting of Ni, Mn, Co, Cr, Si, Mo, Nb, Ti, Mg, Cu, Al, N, C, B, and combinations thereof.

In some embodiments employing laser ablation, in step (c), the selected austenite-phase-stabilizing donor material may be deposited on the one or more first surface regions using electrodeposition, chemical vapor deposition, physical vapor deposition, thermal spraying, plasma spraying, or a combination thereof, for example.

In some methods, the one or more first surface regions have an average thickness from about 1 micron to about 3000 microns.

The first average magnetic permeability is at least 90% higher than the second average magnetic permeability.

The soft magnetic material may be present in a rotor in an electric motor.

Some variations provide a soft magnet with surface-tailored magnetic permeability, wherein the soft magnet comprises:
(i) a first region comprising a first core region and a first surface region, wherein the first core region contains a ferromagnetic material, and wherein the first surface region contains an austenite-phase-stabilizing donor material; and
(ii) a second region comprising a second core region, wherein the second core region contains the ferromagnetic material, and wherein the second region does not contain the austenite-phase-stabilizing donor material;
wherein the first surface region has an average thickness from about 1 micron to about 3000 microns,
wherein the first region is characterized by a first average magnetic permeability,
wherein the second region is characterized by a second average magnetic permeability, and
wherein the first average magnetic permeability is higher than the second average magnetic permeability.

Certain embodiments provide a soft magnet with surface-tailored magnetic permeability, wherein the soft magnet comprises:
(i) a first region comprising a first core region and a first surface region, wherein the first core region contains a ferromagnetic material, and wherein the first surface region contains a first concentration of an austenite-phase-stabilizing donor material; and
(ii) a second region comprising a second core region and a second surface region, wherein the second core region contains the ferromagnetic material, wherein the second surface region contains a second concentration of the austenite-phase-stabilizing donor material, and wherein the second concentration of the austenite-phase-stabilizing donor material is lower than the first concentration of the austenite-phase-stabilizing donor material;
wherein the first surface region has an average thickness from about 1 micron to about 3000 microns,
wherein the first region is characterized by a first average magnetic permeability,
wherein the second region is characterized by a second average magnetic permeability, and
wherein the first average magnetic permeability is higher than the second average magnetic permeability.

In some soft magnets, the ferromagnetic material is selected from the group consisting FeSi, FeNi, FeCo, NiCo, FeSiAl, and combinations thereof.

In some soft magnets, the austenite-phase-stabilizing donor material is selected from the group consisting Ni, Mn, Co, Cr, Si, Mo, Nb, Ti, Mg, Cu, Al, N, C, B, and combinations thereof.

In some soft magnets, the average thickness of the first surface region is from about 100 microns to about 500 microns.

In the first region of the soft magnet, the first surface region may have a thickness that is from about 0.1% to about 50% of the thickness of the first core region, for example.

In some soft magnets, the first average magnetic permeability is at least 90% higher than the second average magnetic permeability. In certain soft magnets, the first average magnetic permeability is at least one order of magnitude higher than said second average magnetic permeability. In various embodiments, the first average magnetic permeability is at least two, three, or four orders of magnitude higher than said second average magnetic permeability (four orders of magnitude is 10000:1 contrast).

The soft magnet may contain multiple instances of the first region and/or the second region.

The soft magnet may be present in a rotor in an electric motor, for example.

DETAILED DESCRIPTION OF EMBODIMENTS OF THE INVENTION

Figure 1:
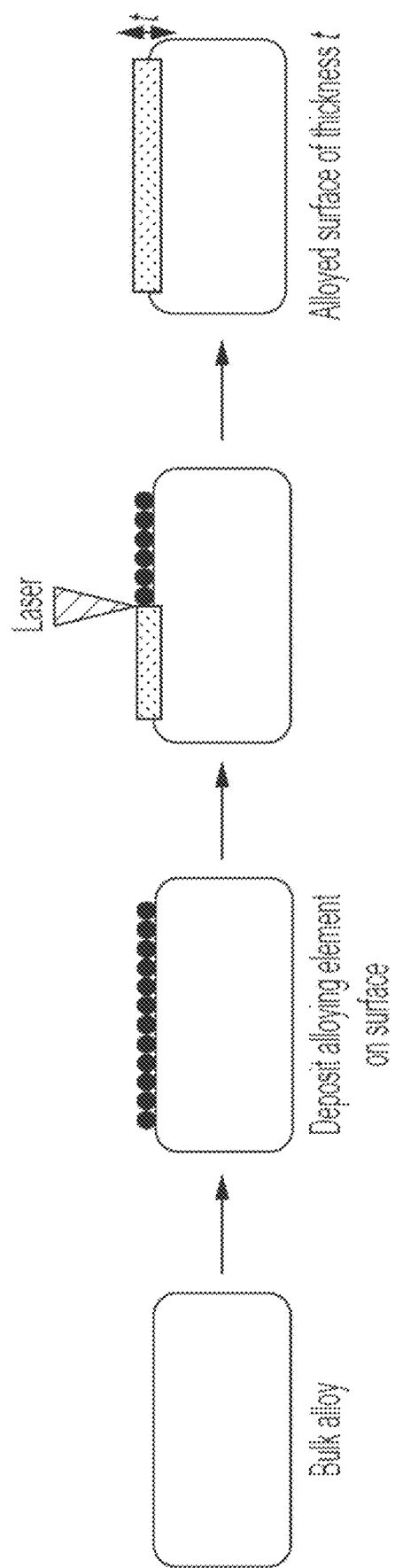
FIG. 1 is a schematic diagram of a method of tailoring a surface of a soft magnetic material.

The methods, structures, systems, and compositions of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

Some variations of the invention provide a rapid, scalable, and low-cost process to manufacture soft magnets that are selectively alloyed at magnet surfaces. The technology allows the surface of an object to be programmed to have selected regions of different magnetic permeability. Regions with high magnetic permeability and low magnetic permeability can be selectively created in three dimensions, allowing for specific control of the magnetic properties and energy densities of a soft magnet.

Soft magnetic materials are those materials that are easily magnetized and demagnetized. A "soft magnet" (or "temporary magnet") typically has intrinsic magnetic coercivity less than 1000 A/m.

Compared to the prior art, the invention reduces the number of steps in order to tailor a magnetic object's surface. The invention eliminates the need for any masking and chemical treatment to remove a mask. Rather than masking and demasking, selective laser melting and/or laser ablation is employed, in order to quickly and efficiently incorporate an austenite-phase-stabilizing material in a targeted manner within the surface of a ferromagnetic material. The invention not only eliminates the need for a complicated mask or chemical treatment, but also reduces processing time and cost.

The present inventors have discovered that selective alloying can be greatly simplified by surface alloying and laser treating (laser melting and/or laser ablation). The simplicity leads to a process that is precise, fast, and reliably repeatable.

Commercial applications of the invention include, but are not limited to, programmable soft-magnet electric motors, electric vehicle (EV) permanent magnet motors, and electric take-off-assist motors and sensors. An exemplary embodiment is to tailor the surface of a rotor for use in an electric vehicle. The surface is tailored via selective alloying of the surface of the rotor, in order to program different magnetic permeabilities into different areas or regions of the rotor surface.

Variations of the invention can be understood in reference to FIG. 1, which is a schematic diagram of a method of tailoring a surface of a soft magnetic material. In FIG. 1, a bulk alloy is selected. The bulk alloy forms the ferromagnetic receiver material with a target receiver metal surface. An alloying element (austenite-phase-stabilizing donor material), such as Ni or Mn, is deposited on the surface. In FIG. 1, the donor material is deposited as a layer of spherical particles, which is for illustration purposes only; the donor material may be a powder, a foil or layer, a vapor-deposited material, a sprayed material, or an electroplated material, for example. A laser is employed to incorporate the donor material into the surface of the ferromagnetic receiver material, via laser melting and/or laser ablation. As shown in FIG. 1, the result is an alloyed surface of thickness t, which can be controlled by adjusting the laser power. The austenite-phase-stabilizing donor material tailors the surface, and consequently the magnetic permeability, of the soft magnet. In FIG. 1, for purposes of this illustration, only a selected first surface region is depicted, not a second surface region for which no deposition is intended.

Some embodiments related to FIG. 1 employ laser ablation rather than laser melting. When using laser ablation, an austenite-phase-stabilizing donor material (e.g., Ni) is still applied to the surface of a ferromagnetic receiver material (e.g., FeSi or FeCo). Rather than using the laser as a heat source to melt the donor material, a laser of adequate power is used to force the donor material into the surface of the receiver material. The donor is not necessarily melted, and is shoved into the surface of the receiver. Certain embodiments related to FIG. 1 employ a combination of laser melting and laser ablation.

Whether laser melting or laser ablation is employed, there may or may not be loss of the donor material or the receiver material, such as by vaporization, sublimation, random diffusion, etc. In some methods, all elements of the receiver material and the donor material remain either in the solid phase or in the liquid phase, below their ordinary boiling points.

Some variations provide a method of tailoring the surface of a soft magnetic material, the method comprising:
(a) providing a selected ferromagnetic receiver material;
(b) providing a selected austenite-phase-stabilizing donor material;
(c) depositing the selected austenite-phase-stabilizing donor material on one or more first surface regions of the ferromagnetic receiver material;
(d) not depositing the selected austenite-phase-stabilizing donor material on one or more second surface regions of the ferromagnetic receiver material;
(e) laser melting the selected austenite-phase-stabilizing donor material into the one or more first surface regions, to form molten austenite-phase-stabilizing donor material; and
(f) solidifying the molten austenite-phase-stabilizing donor material, to form solid austenite-phase-stabilizing donor material that is situated within the one or more first surface regions, thereby selectively alloying the ferromagnetic receiver material in the one or more first surface regions,
wherein the one or more first surface regions are characterized by a first average magnetic permeability following the selective alloying in step (f),
wherein the one or more second surface regions are characterized by a second average magnetic permeability, and
wherein the first average magnetic permeability is higher than the second average magnetic permeability.

Figure 2:
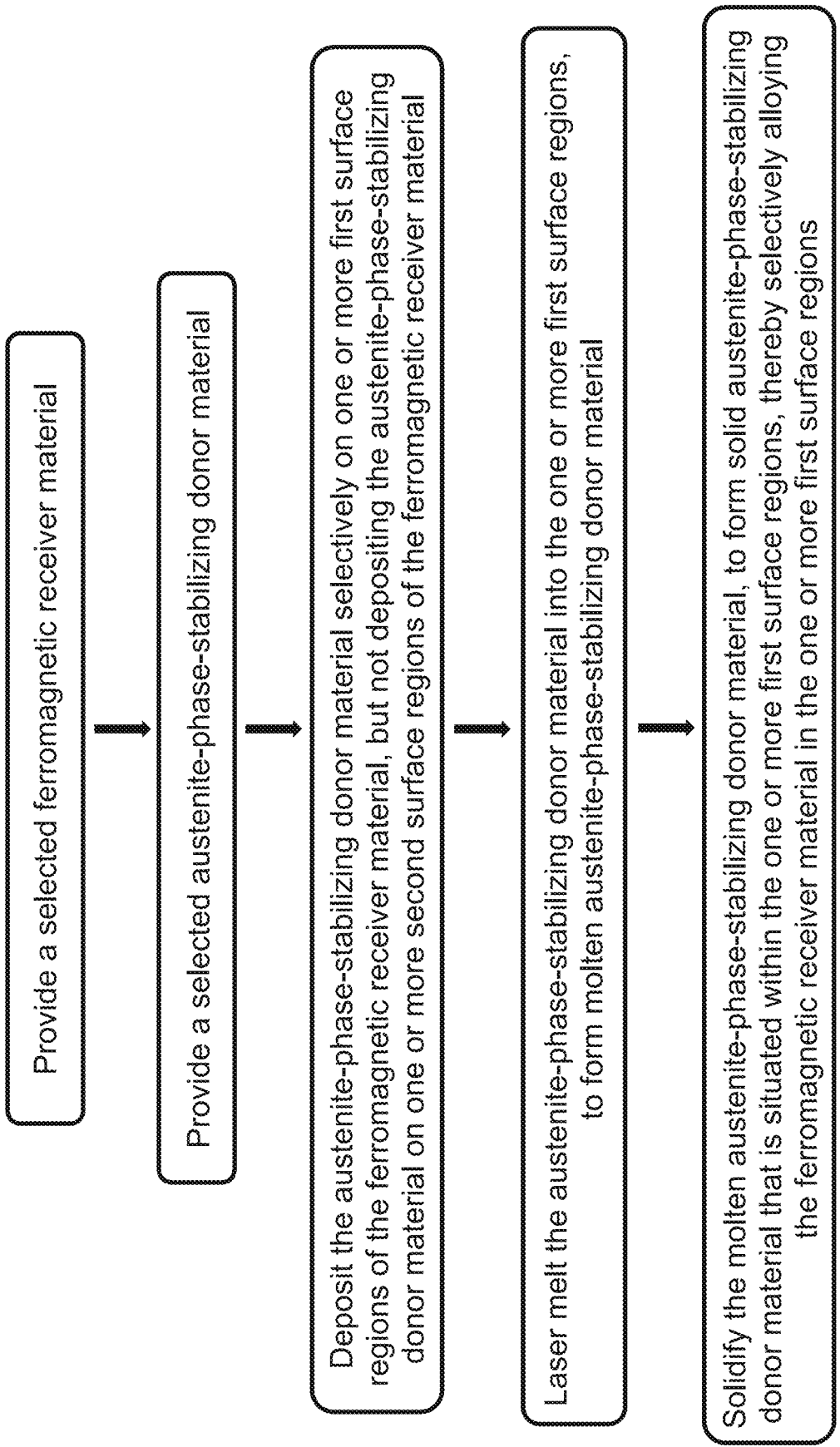
FIG. 2 is an exemplary flowchart summarizing a method of selectively alloying a ferromagnetic receiver material in one or more first surface regions using laser melting and solidification of an austenite-phase-stabilizing donor material.

FIG. 2 is an exemplary flowchart summarizing a method of selectively alloying a ferromagnetic receiver material in one or more first surface regions using laser melting and solidification of an austenite-phase-stabilizing donor material. Because the austenite-phase-stabilizing donor material is melted and then resolidified, the method of FIG. 2 may be regarded as a type of laser-based additive manufacturing.

In some methods, the austenite-phase-stabilizing donor material is deposited in step (c) as powder particles. Alternatively, or additionally, the austenite-phase-stabilizing donor material may be deposited in step (c) as a film, foil, or mesh.

In preferred embodiments, the method does not employ a mask. In preferred embodiments, the method does not employ a chemical treatment.

In some methods, the selected ferromagnetic receiver material is selected from the group consisting of FeSi, FeNi, FeCo, NiCo, FeSiAl, and combinations thereof. Various stoichiometries are possible for any of these ferromagnetic receiver materials. The elements making up the ferromagnetic receiver material may be bonded together to form a molecule (compound), may be in solid solution together as a single-phase alloy, or may be present in a multiphase alloy. Other ferromagnetic receiver materials are possible, such as (but not limited to) iron oxides, iron-zinc alloys, and manganese-zinc alloys.

It is understood that FeSi refers to $Fe_xSi_y$ compounds or alloys, wherein x and y can take on various values to form a compound or alloy of iron and silicon. When x=1 and y=1, the compound is iron monosilicide, $Fe_1Si_1$. When x=2 and y=1, the compound is diiron silicide, $Fe_2Si$. When x=1 and y=2, the compound is iron disilicide, $FeSi_2$, and so on. In some embodiments, the FeSi is a ferrosilicon alloy of iron and silicon with a silicon content by weight of about 1-20%, for example.

It is understood that FeNi refers to $Fe_xNi_y$ compounds or alloys, wherein x and y can take on various values to form a compound or alloy of iron and nickel. For example, FeNi may be a compound selected from $Fe_1Ni_1$, $Fe_2Ni$, $Fe_3Ni$, $FeNi_2$, or a combination thereof. In some embodiments, the FeNi is a ferronickel alloy of iron and nickel with a nickel content by weight of about 2-80%, for example.

It is understood that FeCo refers to $Fe_xCo_y$ compounds or alloys, wherein x and y can take on various values to form a compound or alloy of iron and cobalt. For example, FeCo may be a compound selected from $Fe_1Co_1$, $Fe_2Co$, $Fe_3Co$, or a combination thereof. In some embodiments, the FeCo is a ferrocobalt alloy of iron and cobalt with a cobalt content by weight of about 10-90%, for example.

It is understood that NiCo refers to $Ni_xCo_y$ compounds or alloys, wherein x and y can take on various values to form a compound or alloy of nickel and cobalt. For example, NiCo may be a compound selected from $Ni_1Co_1$, $Ni_2Co$, $NiCo_2$, or a combination thereof. In some embodiments, the NiCo is a nickel-cobalt alloy with a nickel content by weight of about 1% to about 99% and a cobalt content by weight of about 99% to about 1%, for example.

It is understood that FeSiAl refers to $Fe_xSi_yAl_z$ compounds or alloys, wherein x, y, and z can take on various values to form a compound or alloy of iron, silicon, and aluminum. In some embodiments, the FeSiAl is a ferrosilicon-aluminum alloy with a silicon content by weight of about 1% to about 20%, an aluminum content by weight of about 0.1% to about 5%, and the balance iron, for example.

In some methods, the selected austenite-phase-stabilizing donor material is selected from the group consisting of Ni, Mn, Co, Cr, Si, Mo, Nb, Ti, Mg, Cu, Al, N, C, B, and combinations thereof. By "combinations" in this paragraph, it is meant that multiple elements may be utilized as austenite-phase-stabilizing donor materials, such as titanium (Ti) and boron (B) separately, or that multiple elements are combined into a compound or alloy which is employed as the austenite-phase-stabilizing donor material, such as titanium boride ($TiB_2$), or both types of combinations.

In step (c), the selected austenite-phase-stabilizing donor material may be deposited on the one or more first surface regions using slurry coating, laser cladding, electron beam cladding, electroplating, electroless plating, wire arc deposition, chemical vapor deposition, physical vapor deposition, thermal spraying, plasma spraying, or a combination thereof, for example. In certain embodiments, the selected austenite-phase-stabilizing donor material is deposited on one or more first surface regions by laying down a powder, a sheet, a film, or a slab on the first surface regions but not the second surface regions.

In step (d), the selected austenite-phase-stabilizing donor material is not deposited on one or more second surface regions of the ferromagnetic receiver material. The design of the final soft magnet will dictate the quantity, size, and distribution of the second surface regions compared to the first surface regions (into which the austenite-phase-stabilizing donor material is deposited). Depending on the deposition technique, one skilled in the art of materials science will understand how to selectively deposit donor material in the first surface regions but not in the second surface regions.

For example, in the case of laser cladding or electron beam cladding, precise cladding is possible in targeted regions (the first surface regions). The cladding is the austenite-phase-stabilizing donor material, which is not necessarily the solid austenite-phase-stabilizing donor material later formed in step (f). In certain embodiments employing laser cladding in step (c), the laser cladding in step (c) and the laser melting in step (e) are integrated or overlap in time, so that during step (c), there is laser melting of the donor material into the first surface regions. This can be sequential, with laser cladding occurring first, followed by laser melting; or simultaneous, with laser cladding happening at the same time as laser melting; or a combination thereof.

In the case of wire arc deposition, the wire diameter, the wire placement, the anode-cathode configuration, and the electrical power can be optimized for precise deposition of the austenite-phase-stabilizing donor material.

In the case of chemical vapor deposition, physical vapor deposition, thermal spraying, and plasma spraying, the deposited or sprayed austenite-phase-stabilizing donor material may be directed to the targeted second surface regions selectively without the use of a mask, in various ways. For example, in selective vapor deposition, high selectivity of deposition of the austenite-phase-stabilizing donor material in the first surface regions (versus the second surface regions) may be obtained by different chemical behavior of reactants with the underlying substrate, which in this case is the ferromagnetic receiver material.

In the case of electroplating or electroless plating, selective plating may be utilized. In some embodiments of selective plating, a brush holds a plating solution. Through the use of low voltage, the brush dipped in plating solution allows for localized plating. Selective electroplating may be used to apply an even distribution of plating material across a localized (selective) area, corresponding to the first surface regions. Unlike full electroplating techniques which require an immersion in an electrolyte bath, selective plating targets a specific area using a plating solution of electrolyte and anode connected to a wire.

In the case of depositing the austenite-phase-stabilizing donor material in the first surface regions by laying down a powder, a sheet, or another type of object, there are various ways to do such deposition in a spatially selective manner. Powder may be selectively laid down in the first regions but not the second regions, being careful not to disturb the volumes of powder. This technique is especially viable for low concentration of austenite-phase-stabilizing donor material, since electrostatic interactions between powder and surface may be sufficient to hold powder in place where intended. At higher concentrations of austenite-phase-stabilizing donor material, a powder binder may be used to bond the powder with the ferromagnetic receiver material. Pre-sized sheets or films may be selectively laid down in the first regions but not the second regions. Again, if necessary, a binder may be used to bond the sheet/film with the ferromagnetic receiver material.

Another variation may utilize a patterned object (e.g., a mesh or a concentric-circle pattern) laid down on the ferromagnetic receiver material, where the pattern is, or correlates with, the selective pattern of the first and second surface regions. Note that this is very different from a mask. When using a mask, the mask physically blocks laser access to the underlying substrate. By contrast, in these embodiments using a patterned object, the pattern form the regions for which material will be deposited, not the regions for which material will be blocked/masked. These embodiments essentially combine step (c) and step (d), in the sense that laying down a patterned object deposits the donor material on one or more first surface regions and simultaneously does not deposit donor material on one or more second surface regions.

During step (e) of variations employing laser melting (rather than laser ablation), there is penetration of a molten form of the donor material. During and after solidification of the molten donor material to a solid austenite-phase-stabilizing donor material, additional penetration within the first surface regions may occur, typically by diffusion. Because the diffusivity of the donor material is expected to be much higher in a liquid phase versus in a solid phase, most of the penetration will usually happen prior to solidification.

In some embodiments, the ferromagnetic receiver material does not melt, and remains solid during steps (c), (d), (e), and (f). In other embodiments, the laser energy reaches the ferromagnetic receiver material, and a portion (not the entirety) of the receiver material melts. Some of the ferromagnetic receiver material may be laser-melted due to direct exposure of laser photons, such as in gaps between donor material particles or sheets. Or, some of the ferromagnetic receiver material may be laser-melted due to indirect heat transfer from the donor material, after it has melted from the laser energy. It will be recognized that whether any of the ferromagnetic receiver material melts will be dictated by its properties (at least, its melting point) as well as the heat and mass transfer within the system, which in turn is influenced by the laser power, the laser time, the amount and thickness of donor layer, the material thermal diffusivities, and so on.

In certain embodiments, a precursor for a selected austenite-phase-stabilizing donor material may be deposited on one or more first surface regions of the ferromagnetic receiver material. The precursor contains the selected austenite-phase-stabilizing donor material as well as other elements that are driven off during step (c) or thereafter. As one example, when the selected austenite-phase-stabilizing donor material is nitrogen (N), a precursor may be ammonia, $NH_3$. The ammonia may be deposited via vapor deposition, such that $NH_3$ molecules adsorb on the surface. During laser melting, the $NH_3$ may decompose into surface-adsorbed N, which remains in (and can penetrate within) the first surface region; and vapor-phase $H_2$, which is released to the atmosphere and does not remain in the first surface region. The local temperature caused by the laser interaction is expected to be sufficiently high for such a decomposition reaction, which also may be catalyzed by the surface of the ferromagnetic receiver material.

Figure 8A:
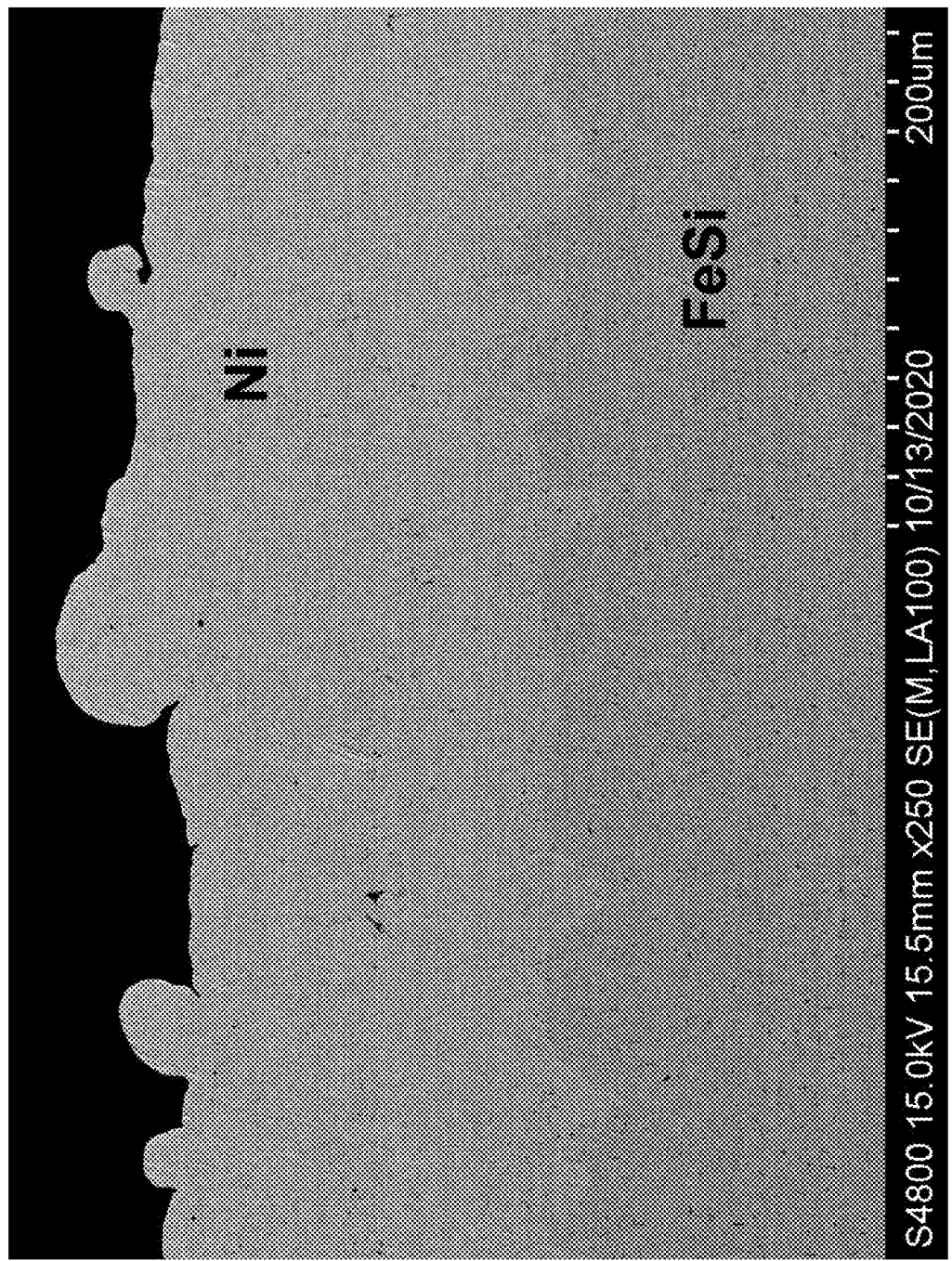
FIG. 8A is a micrograph image from a scanning electron microscope (SEM) of a cross section of the Ni foil welded onto the FeSi sheet (scale bar=200 microns), in Example 1.
Figure 8B:
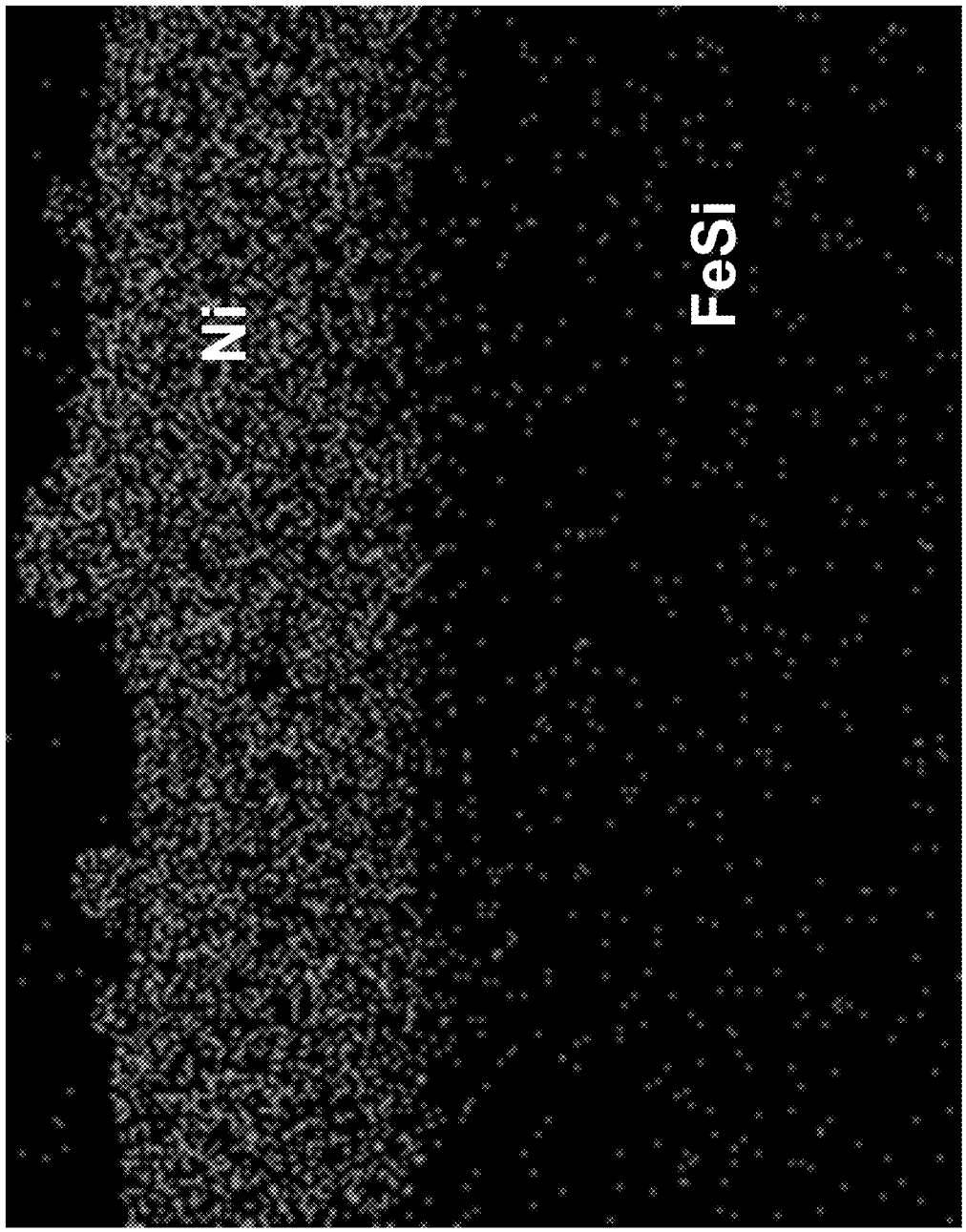
FIG. 8B is an energy dispersive X-ray spectroscopy (EDS) map showing the different compositions present, in Example 1.

In step (f), there is solid austenite-phase-stabilizing donor material situated on or in the one or more first surface regions (e.g., see FIGS. 8A and 8B). Ideally, there is perfect selectivity such that the first surface regions have a uniform concentration of austenite-phase-stabilizing donor material that has penetrated within those regions, while the second surface regions are entirely free of any austenite-phase-stabilizing donor material. Practically, perfect selectivity can be difficult to achieve. Some tolerance is usually acceptable, depending on the application of the soft magnetic material and the required magnetic properties. In particular, some austenite-phase-stabilizing donor material may be situated on or in one or more defective second surface regions; likewise, there may be defective first surface regions that do not have austenite-phase-stabilizing donor material situated on or in such defective regions. The austenite-phase-stabilizing donor material selectivity may be quantified as the percentage of austenite-phase-stabilizing donor material situated on or in the first surface regions, relative to all austenite-phase-stabilizing donor material situated on or in all surface regions of the ferromagnetic receiver material. For example, if the austenite-phase-stabilizing donor material is perfectly situated on or in the first surface regions, and none of the donor material is situated on or in the second surface regions, then the austenite-phase-stabilizing donor material selectivity is 100%. If the austenite-phase-stabilizing donor material is erroneously situated on or in the second surface regions, and none of the donor material is correctly situated on or in the first surface regions, then the austenite-phase-stabilizing donor material selectivity is 0%. If there is a random distribution of donor material across all surface regions, and in the hypothetical case in which the first and second surface regions have equal collective volumes, then the austenite-phase-stabilizing donor material selectivity is 50%. Preferably, the austenite-phase-stabilizing donor material selectivity is at least 80%, more preferably at least 90%, and most preferably at least 91%, 92%, 93%, 94%, 95%, 96%, 97%, 98%, 99%, 99.5%, 99.9%, 99.95%, 99.99%, or 100%, including all intervening ranges.

In certain alternative embodiments, 100% selectivity is not desired. Rather, in these alternative embodiments, first surface regions have a first concentration of the austenite-phase-stabilizing donor material, and second surface regions have a second concentration of the austenite-phase-stabilizing donor material, wherein the second concentration is lower than the first concentration but higher than 0.

Following step (f), the one or more first surface regions may have an average thickness from about 1 micron to about 3000 microns, for example. In certain embodiments, the average thickness is from about 100 microns to about 500 microns. In various embodiments, the average thickness is about, at least about, or at most about 1, 2, 5, 10, 25, 50, 75, 100, 150, 200, 250, 300, 400, 500, 600, 750, 1000, 1500, 2000, 2500, or 3000 microns, including any intervening range. The average thickness of the first surface regions is defined as the depth (units of length) that contains, on average, 99 wt % of the austenite-phase-stabilizing donor material. This definition is used to ignore stray or impurity donor elements, and to account for embodiments in which the donor material is primarily situated on top of the ferromagnetic receiver material, embodiments in which the donor material is fully penetrated within the ferromagnetic receiver material, and embodiments in which there is donor material both on top and penetrated within the ferromagnetic receiver material. To illustrate, in FIG. 8A, it is estimated that 99 wt % of the Ni (donor material) is within a layer that has a thickness of approximately 175 μm. In the embodiment of FIG. 8A, there is donor nickel both on top of, and penetrated within, the ferromagnetic receiver material, FeSi.

In some embodiments, the solid austenite-phase-stabilizing donor material is situated within one or more first surface regions, not merely a coating disposed solely on top of the ferromagnetic receiver material. A portion of the donor material may be situated on top of the first surface region. Preferably, at least a portion of the donor material is penetrated within the first surface region, such that the donor material becomes blended (uniformly or non-uniformly) with the ferromagnetic receiver material. This is evident in FIG. 8B, where Ni (lighter dots) has clearly penetrated into, and is therefore situated in, the FeSi ferromagnetic receiver material. Penetration of the austenite-phase-stabilizing donor material into the volume of the ferromagnetic receiver material is believed to be beneficial for the magnetic properties. The donor-material penetration results from either laser melting or laser ablation as disclosed herein.

Note that some amount of penetration of donor material into the ferromagnetic receiver material can occur when a molten form of the ferromagnetic receiver material moves towards the surface, causing intermixing with donor elements. In the frame of reference of the donor elements, they are penetrating into the ferromagnetic receiver material.

In some methods, the first average magnetic permeability is at least 90% higher than the second average magnetic permeability. In certain embodiments, the first average magnetic permeability is at least 99% higher than the second average magnetic permeability. In various embodiments, the first average magnetic permeability is at least 50%, 60%, 70%, 80%, 90%, 99%, 100%, 150%, 200%, 300%, 400%, 500%, 600%, 700%, 800%, 900%, or 1000% higher than the second average magnetic permeability. The ratio of the first average magnetic permeability to the second average magnetic permeability is the magnetic-permeability contrast between the first surface regions and the second surface regions. For example, when the first average magnetic permeability is 1000% higher than the second average magnetic permeability, there is a 10:1 magnetic-permeability contrast (or, one order of magnitude). In various embodiments, the magnetic-permeability contrast is about, or at least about, 10:1, 50:1, 100:1, 500:1, 1000:1, 2000:1, 5000:1, 10000:1, 20000:1, or 50000:1. In various embodiments, the first average magnetic permeability is at least two, three, or four orders of magnitude higher than said second average magnetic permeability (four orders of magnitude is 10000:1 contrast, which is preferred in some embodiments).

In some methods employing laser melting, the soft magnetic material is used in a rotor in an electric motor, for example. The above-described contrast between magnetic permeabilities in the first and second surface regions is very useful for rotors, especially rotors used in electric motors (e.g., for electric vehicles).

Other variations provide a method of tailoring the surface of a soft magnetic material, the method comprising:
(a) providing a selected ferromagnetic receiver material;
(b) providing a selected austenite-phase-stabilizing donor material;
(c) depositing the selected austenite-phase-stabilizing donor material on one or more first surface regions of the ferromagnetic receiver material;
(d) not depositing the selected austenite-phase-stabilizing donor material on one or more second surface regions of the ferromagnetic receiver material; and
(e) laser ablating the selected austenite-phase-stabilizing donor material into the one or more first surface regions, to force the selected austenite-phase-stabilizing donor material to penetrate into the one or more first surface regions, thereby selectively alloying the ferromagnetic receiver material in the one or more first surface regions,
wherein the one or more first surface regions are characterized by a first average magnetic permeability,
wherein the one or more second surface regions are characterized by a second average magnetic permeability, and
wherein the first average magnetic permeability is higher than the second average magnetic permeability.

Figure 3:
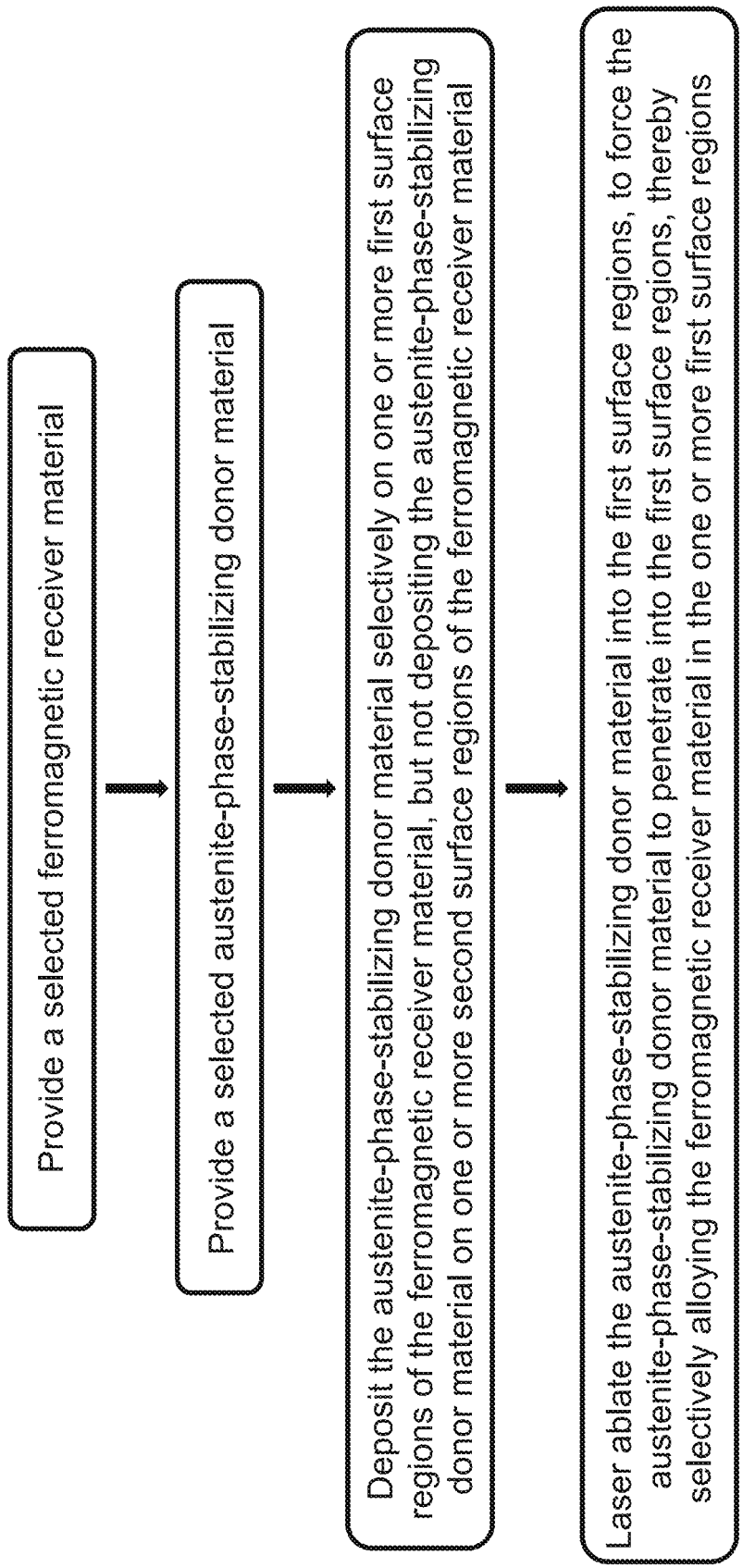
FIG. 3 is an exemplary flowchart summarizing a method of selectively alloying a ferromagnetic receiver material in one or more first surface regions using laser ablation to force an austenite-phase-stabilizing donor material to penetrate into the first surface regions.

FIG. 3 is an exemplary flowchart summarizing a method of selectively alloying a ferromagnetic receiver material in one or more first surface regions using laser ablation to force an austenite-phase-stabilizing donor material to penetrate into the first surface regions.

In this specification, "laser ablating" and "laser ablation" are defined as the use of a laser to physically force a first material (in the present context, the donor material) into a second material (in the present context, the receiver material). In some embodiments, laser ablation utilizes momentum transfer of a donor material impinging a selected surface of the receiver material. With laser ablation, donor atoms may be shoved into pores or spaces between receiver material molecules, trapped in crystal lattices of receiver material molecules, intercalated within receiver material molecules, dissolved in the same phase as receiver material molecules, suspended within another phase that is different from the receiver-material phase, or a combination thereof. In these embodiments, there may be no loss of the receiver material whatsoever.

In other embodiments using laser ablation, there may be erosion of a small portion of the first surface regions, whereby ferromagnetic receiver material is ejected or evolved, such as via spallation. Such removal of receiver material may provide space for donor material to be shoved into. However, ejection of ferromagnetic receiver material is generally not desirable because receiver material is lost (reduced mass efficiency) and may become lodged elsewhere as an impurity.

In certain embodiments, laser ablation utilizes a pulsed laser or a high-intensity, continuous-wave laser beam. While relatively long laser pulses (e.g. nanosecond pulses) can overheat and thermally damage the receiver or donor materials, ultrashort laser pulses (e.g. femtoseconds) cause minimal material damage during processing due to the ultrashort light-matter interaction. Excimer lasers of deep ultraviolet light (such as with a wavelength of about 100 nm) may be used in laser ablation.

A combination of laser-melting and laser-ablation mechanisms may be employed in certain methods of tailoring the surface of a soft magnetic material, selectively at one or more first surface regions. When both laser melting and laser ablation are employed, at least a portion of the austenite-phase-stabilizing donor material is melted via a laser. The molten donor material solidifies on or in the one or more first surface regions. Using the same laser or possibly a different laser, at least a portion of the austenite-phase-stabilizing donor material is physically shoved into the ferromagnetic receiver material. The donor material may be forced into the same first surface regions onto/into which the solidified (from laser melting) donor material resides. Alternatively, or additionally, the donor material may be forced into a different subset of first surface regions. In certain embodiments, the donor material is melted and then, as molten molecules, shoved into the receiver material, which may be solid or molten. In certain embodiments, a first portion of donor material is melted and solidified on or in some first surface regions, while a second portion of donor material does not melt but is ablated into the same first surface regions and/or other first surface regions.

When laser melting is combined with laser ablation, it is still the case that preferably no donor material is deposited on or in the second surface regions. In principle, third surface regions may be selected, and laser melting or laser ablation may be employed to deposit donor material on or in the third surface regions, while laser ablation or laser melting, respectively, may be employed to deposit donor material on or in the first surface regions, all the while avoiding any deposition on or in the second surface regions. These embodiments may be employed in cases where the tailored magnetic properties are different for laser melting versus laser ablation, or when different donor materials are desired in different selected regions, for example.

In some methods employing laser ablation, the austenite-phase-stabilizing donor material is deposited in step (c) as powder particles. Alternatively, or additionally, the austenite-phase-stabilizing donor material may be deposited in step (c) as a film, foil, or mesh.

In preferred embodiments employing laser ablation, the method does not employ a mask. In preferred embodiments employing laser ablation, the method does not employ a chemical treatment.

In some methods employing laser ablation, the selected ferromagnetic receiver material is selected from the group consisting of FeSi, FeNi, FeCo, NiCo, FeSiAl, and combinations thereof. Various stoichiometries are possible for any of these ferromagnetic receiver materials. The elements making up the ferromagnetic receiver material may be bonded together to form a molecule (compound), may be in solid solution together as a single-phase alloy, or may be present in a multiphase alloy.

When using laser ablation, as was described above for laser melting, it is understood that FeSi refers to $Fe_xSi_y$ compounds or alloys, wherein x and y can take on various values to form a compound or alloy of iron and silicon. When x=1 and y=1, the compound is iron monosilicide, $Fe_1Si_1$. When x=2 and y=1, the compound is diiron silicide, $Fe_2Si$. When x=1 and y=2, the compound is iron disilicide, $FeSi_2$, and so on. In some embodiments, the FeSi is a ferrosilicon alloy of iron and silicon with a silicon content by weight of about 1-20%, for example.

It is understood that FeNi refers to $Fe_xNi_y$ compounds or alloys, wherein x and y can take on various values to form a compound or alloy of iron and nickel. For example, FeNi may be a compound selected from $Fe_1Ni_1$, $Fe_2Ni$, $Fe_3Ni$, $FeNi_2$, or a combination thereof. In some embodiments, the FeNi is a ferronickel alloy of iron and nickel with a nickel content by weight of about 2-80%, for example.

It is understood that FeCo refers to $Fe_xCo_y$ compounds or alloys, wherein x and y can take on various values to form a compound or alloy of iron and cobalt. For example, FeCo may be a compound selected from $Fe_1Co_1$, $Fe_2Co$, $Fe_3Co$, or a combination thereof. In some embodiments, the FeCo is a ferrocobalt alloy of iron and cobalt with a cobalt content by weight of about 10-90%, for example.

It is understood that NiCo refers to $Ni_xCo_y$ compounds or alloys, wherein x and y can take on various values to form a compound or alloy of nickel and cobalt. For example, NiCo may be a compound selected from $Ni1Co1$, $Ni_2Co$, $NiCo_2$, or a combination thereof. In some embodiments, the NiCo is a nickel-cobalt alloy with a nickel content by weight of about 1% to about 99% and a cobalt content by weight of about 99% to about 1%, for example.

It is understood that FeSiAl refers to $Fe_xSi_yAl_z$ compounds or alloys, wherein x, y, and z can take on various values to form a compound or alloy of iron, silicon, and aluminum. In some embodiments, the FeSiAl is a ferrosilicon-aluminum alloy with a silicon content by weight of about 1% to about 20%, an aluminum content by weight of about 0.1% to about 10%, and the balance iron, for example.

In some methods employing laser ablation, the selected austenite-phase-stabilizing donor material is selected from the group consisting of Ni, Mn, Co, Cr, Si, Mo, Nb, Ti, Mg, Cu, Al, N, C, B, and combinations thereof. By "combinations" in this paragraph, it is meant that multiple elements may be utilized as austenite-phase-stabilizing donor materials, such as nickel (Ni) and boron (B) separately, or that multiple elements are combined into a compound or alloy which is employed as the austenite-phase-stabilizing donor material, such as dinickel boride ($Ni_2B$), or both types of combinations.

When using laser ablation, in step (c), the selected austenite-phase-stabilizing donor material may be deposited on the one or more first surface regions using slurry coating, laser cladding, electron beam cladding, electroplating, electroless plating, wire arc deposition, chemical vapor deposition, physical vapor deposition, thermal spraying, plasma spraying, or a combination thereof, for example. In certain embodiments, the selected austenite-phase-stabilizing donor material is deposited on one or more first surface regions by laying down a powder, a sheet, a film, or a slab on the first surface regions but not the second surface regions.

When using laser ablation, in step (d), the selected austenite-phase-stabilizing donor material is not deposited on one or more second surface regions of the ferromagnetic receiver material. The design of the final soft magnet will dictate the quantity, size, and distribution of the second surface regions compared to the first surface regions (into which the austenite-phase-stabilizing donor material is deposited). Depending on the deposition technique, one skilled in the art of materials science will understand how to selectively deposit donor material in the first surface regions but not in the second surface regions. The next seven paragraphs further describe various means of deposition of the donor material, in embodiments using laser ablation.

In the case of laser cladding or electron beam cladding, precise cladding is possible in targeted regions (the first surface regions). The cladding is the austenite-phase-stabilizing donor material, which is not necessarily the solid austenite-phase-stabilizing donor material later formed in step (f). In certain embodiments employing laser cladding in step (c), laser cladding in step (c) and laser ablation in step (e) are integrated or overlap in time, so that during step (c), there is physical penetration (by force) of the donor material into the first surface regions. This can be sequential, with laser cladding occurring first, followed by laser ablation; or simultaneous, with laser cladding happening at the same time as laser ablation; or a combination thereof.

In the case of wire arc deposition, the wire diameter, the wire placement, the anode-cathode configuration, and the electrical power can be optimized for precise deposition of the austenite-phase-stabilizing donor material.

In the case of chemical vapor deposition, physical vapor deposition, thermal spraying, and plasma spraying, the deposited or sprayed austenite-phase-stabilizing donor material may be directed to the targeted second surface regions selectively without the use of a mask, in various ways. For example, in selective vapor deposition, high selectivity of deposition of the austenite-phase-stabilizing donor material in the first surface regions (versus the second surface regions) may be obtained by different chemical behavior of reactants with the underlying substrate, which in this case is the ferromagnetic receiver material.

In the case of electroplating or electroless plating, selective plating may be utilized. In some embodiments of selective plating, a brush holds a plating solution. Through the use of low voltage, the brush dipped in plating solution allows for localized plating. Selective electroplating may be used to apply an even distribution of plating material across a localized (selective) area, corresponding to the first surface regions. Unlike full electroplating techniques which require an immersion in an electrolyte bath, selective plating targets a specific area using a plating solution of electrolyte and anode connected to a wire.

In the case of depositing the austenite-phase-stabilizing donor material in the first surface regions by laying down a powder, a sheet, or another type of object, there are various ways to do such deposition in a spatially selective manner. Powder may be selectively laid down in the first regions but not the second regions, being careful not to disturb the volumes of powder. This technique is especially viable for low concentration of austenite-phase-stabilizing donor material, since electrostatic interactions between powder and surface may be sufficient to hold powder in place where intended. At higher concentrations of austenite-phase-stabilizing donor material, a powder binder may be used to bond the powder with the ferromagnetic receiver material. Presized sheets or films may be selectively laid down in the first regions but not the second regions. Again, if necessary, a binder may be used to bond the sheet/film with the ferromagnetic receiver material.

Another variation may utilize a patterned object (e.g., a mesh or a concentric-circle pattern) laid down on the ferromagnetic receiver material, where the pattern is, or correlates with, the selective pattern of the first and second surface regions. Note that this is very different from a mask. When using a mask, the mask physically blocks laser access to the underlying substrate. By contrast, in these embodiments using a patterned object, the pattern form the regions for which material will be deposited, not the regions for which material will be blocked/masked. These embodiments essentially combine step (c) and step (d), in the sense that laying down a patterned object deposits the donor material on one or more first surface regions and simultaneously does not deposit donor material on one or more second surface regions.

During step (e) of variations employing laser ablation, there is penetration of a solid form of the donor material, by forced convection, without being limited to theory. Additional penetration within the first surface regions may occur, such as by diffusion. Because convection of the donor material is expected to be faster than diffusion, typically most of the donor-material penetration is due to convection caused by laser ablation, when laser ablation is used.

In some embodiments employing laser ablation, the ferromagnetic receiver material does not melt, and remains solid during steps (c), (d), and (e). In other embodiments, the laser energy reaches the ferromagnetic receiver material, and a portion (not the entirety) of the receiver material melts. Some of the ferromagnetic receiver material may be laser-melted due to direct exposure of laser photons, such as in gaps between donor material particles or sheets. Or, some of the ferromagnetic receiver material may be laser-melted due to indirect heat transfer from the donor material, giving up its energy that originally came from the laser. It will be recognized that whether any of the ferromagnetic receiver material melts will be dictated by its properties (at least, its melting point) as well as the heat and mass transfer within the system, which in turn is influenced by the laser power, the laser time, the amount and thickness of donor layer, the material thermal diffusivities, and so on. It may be advantageous for the ferromagnetic receiver material to partially melt, because the physical shoving (momentum transfer) of donor elements may be enhanced when the receiver material is molten rather than solid.

In certain embodiments employing laser ablation, a precursor for a selected austenite-phase-stabilizing donor material may be deposited on one or more first surface regions of the ferromagnetic receiver material. The precursor contains the selected austenite-phase-stabilizing donor material as well as other elements that are driven off during step (e). As one example, when the selected austenite-phase-stabilizing donor material is boron (B), a precursor may be diborane, $B_2H_6$. The diborane may be deposited via vapor deposition, such that $B_2H_6$ molecules adsorb on the surface. During laser ablation, or optionally as an additional treatment step prior to laser ablation, the $B_2H_6$ may decompose into surface-adsorbed B, which can penetrate by force into the first surface region; and vapor-phase $H_2$, which is released to the atmosphere and does not remain in the first surface region. The local temperature caused by the laser ablation is expected to be sufficiently high for such a decomposition reaction, which also may be catalyzed by the surface of the ferromagnetic receiver material.

Following step (e) in methods using laser ablation, there is solid austenite-phase-stabilizing donor material situated in (penetrated into) the one or more first surface regions. Ideally, there is perfect selectivity such that the first surface regions have a uniform concentration of austenite-phase-stabilizing donor material that has penetrated into those regions, while the second surface regions are entirely free of any austenite-phase-stabilizing donor material. Practically, perfect selectivity can be difficult to achieve. Some tolerance is usually acceptable, depending on the application of the soft magnetic material and the required magnetic properties. In particular, some austenite-phase-stabilizing donor material may be situated on or in one or more defective second surface regions; likewise, there may be defective first surface regions that do not have austenite-phase-stabilizing donor material situated therein. The austenite-phase-stabilizing donor material selectivity may be quantified as the percentage of austenite-phase-stabilizing donor material situated in the first surface regions, relative to all austenite-phase-stabilizing donor material situated on or in all surface regions of the ferromagnetic receiver material. For example, if the austenite-phase-stabilizing donor material is perfectly situated in the first surface regions, and none of the donor material is situated on or in the second surface regions, then the austenite-phase-stabilizing donor material selectivity is 100%. If the austenite-phase-stabilizing donor material is erroneously situated on or in the second surface regions, and none of the donor material is correctly situated in the first surface regions, then the austenite-phase-stabilizing donor material selectivity is 0%. If there is a random distribution of donor material across all surface regions, and in the hypothetical case in which the first and second surface regions have equal collective volumes, then the austenite-phase-stabilizing donor material selectivity is 50%. Preferably, in embodiments employing laser ablation, the austenite-phase-stabilizing donor material selectivity is at least 75%, more preferably at least 85%, and most preferably at least 86%, 87%, 88%, 89%, 90%, 91%, 92%, 93%, 94%, 95%, 96%, 97%, 98%, 99%, or 100%, including all intervening ranges.

Following step (e) in methods using laser ablation, the one or more first surface regions may have an average thickness from about 1 micron to about 3000 microns, for example. In certain embodiments, the average thickness is from about 100 microns to about 500 microns. In various embodiments, the average thickness is about, at least about, or at most about 1, 2, 5, 10, 25, 50, 75, 100, 150, 200, 250, 300, 400, 500, 600, 750, 1000, 1500, 2000, 2500, or 3000 microns, including any intervening range. The average thickness of the first surface regions is defined as the depth (units of length) that contains, on average, 99 wt % of the austenite-phase-stabilizing donor material. This definition is used to ignore stray or impurity donor elements, and to account for various penetration depths of the donor material.

In embodiments employing laser ablation, the solid austenite-phase-stabilizing donor material is preferably situated within one or more first surface regions, not merely a coating disposed solely on top of the ferromagnetic receiver material. A portion of the donor material may be situated on top of the first surface region. For example, a few atoms of donor material may have had insufficient momentum to penetrate farther than the surface. Due to the force-derived penetration, the donor material is blended (uniformly or non-uniformly) with the ferromagnetic receiver material. Penetration of the austenite-phase-stabilizing donor material into the volume of the ferromagnetic receiver material is believed to be beneficial for the magnetic properties.

In some methods employing laser ablation, the first average magnetic permeability is at least 90% higher than the second average magnetic permeability. In certain embodiments, the first average magnetic permeability is at least 99% higher than the second average magnetic permeability. In various embodiments employing laser ablation, the first average magnetic permeability is at least 50%, 60%, 70%, 80%, 90%, 99%, 100%, 150%, 200%, 300%, 400%, or 500% higher than the second average magnetic permeability. When the first average magnetic permeability is 500% higher than the second average magnetic permeability, there is a 5:1 contrast between magnetic permeabilities of the first surface regions compared to the second surface regions.

In some methods employing laser ablation, the soft magnetic material is used in a rotor in an electric motor, for example.

In some methods employing laser melting or laser ablation, an electromagnetic field is applied during fabrication of the soft magnetic material. An electromagnetic field may be applied across the ferromagnetic receiver material during one or more steps.

Figure 4:
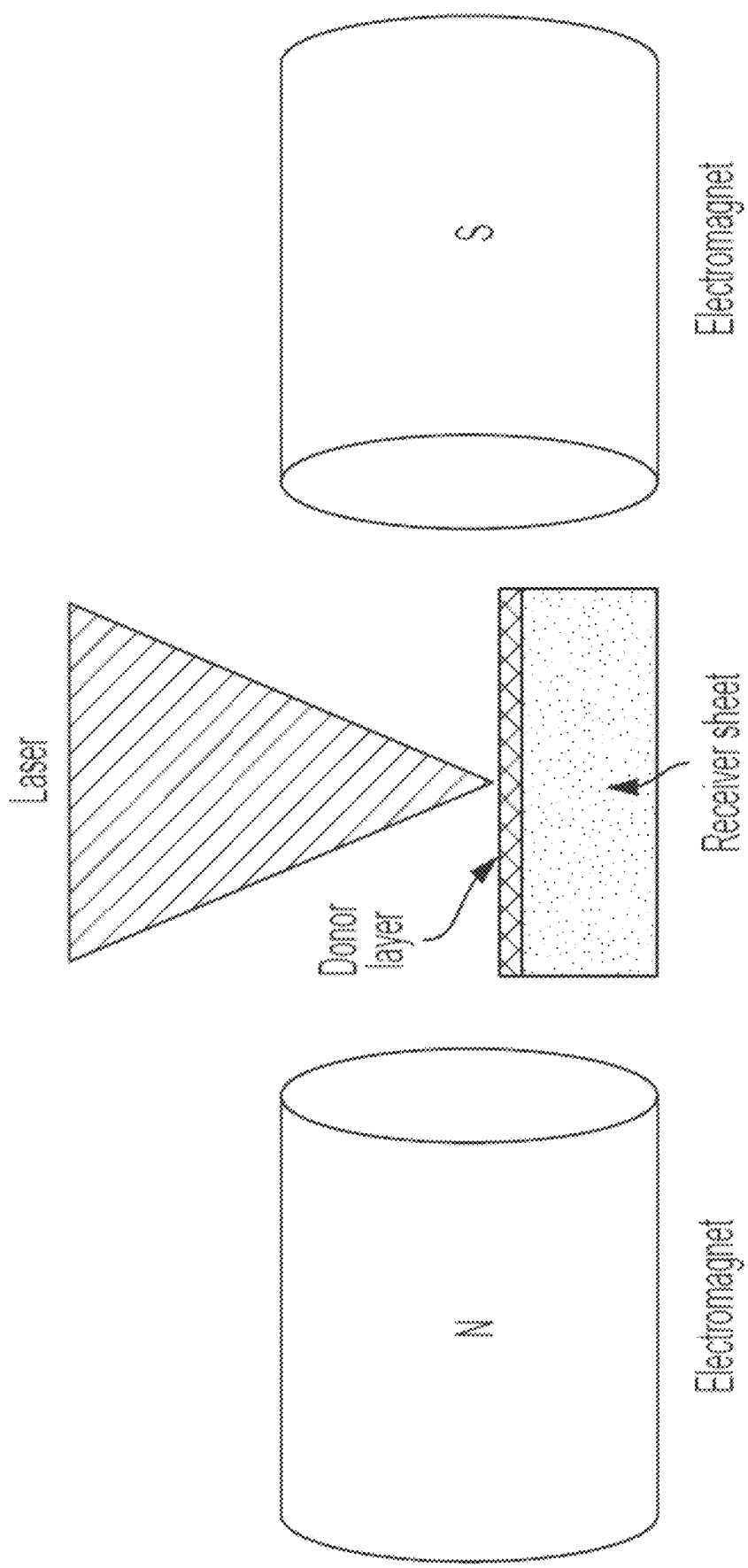
FIG. 4 is a schematic diagram showing two electromagnets, one acting as a north (N) magnetic pole and the other acting as a south (S) magnetic pole.

FIG. 4 is a schematic diagram showing two electromagnets, one acting as a north (N) magnetic pole and the other acting as a south (S) magnetic pole. An electromagnet is a type of magnet in which the magnetic field is produced by an electric current. Electromagnets may consist of wire (e.g., copper wire) wound into a coil. A current through the wire creates a magnetic field which is concentrated in the hole in the center of the coil. The electromagnet N—S pair is spaced apart, with a receiver sheet (ferromagnetic receiver material), a donor layer (austenite-phase-stabilizing donor material), and a laser configured for laser melting or laser ablation of the donor material. The ferromagnetic receiver material is the soft magnetic material being tailored. In FIG. 4, for purposes of this illustration, only a first surface region is depicted, not a second surface region.

Figure 5:
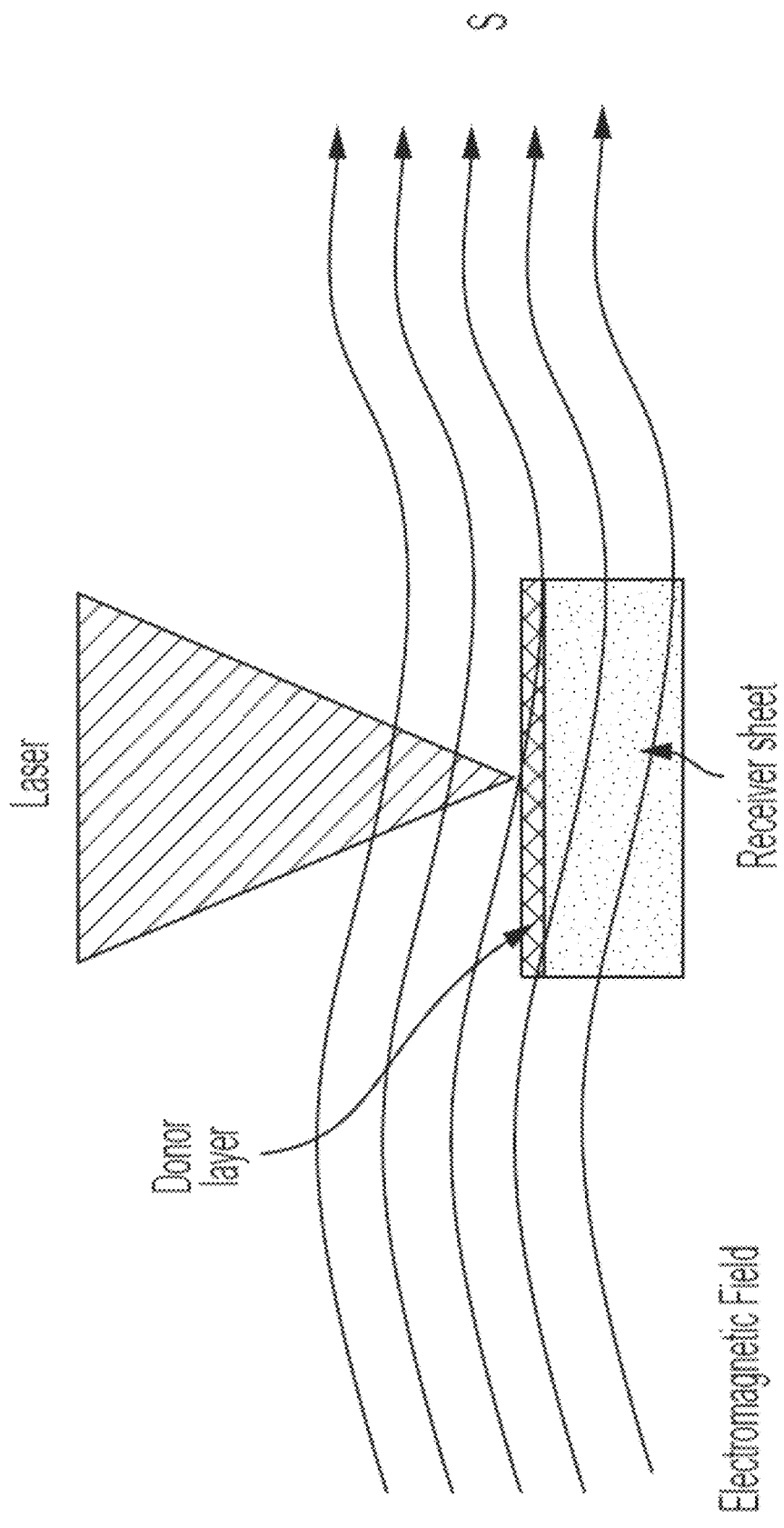
FIG. 5 is a schematic diagram, similar to FIG. 4, showing a north (N) magnetic pole and a south (S) magnetic pole.

FIG. 5 is a schematic diagram, similar to FIG. 4, showing a north (N) magnetic pole and a south (S) magnetic pole. The N—S poles are spaced apart such that when electric current is applied to the electromagnets, a magnetic field is created. The magnetic field is depicted, in a simplified way, as wavy magnetic field lines in FIG. 5. The N—S pole spacing may vary, from about 0.1 mm to about 1 m, such as from about 1 mm to about 100 mm. The strength of the magnetic field may vary, causing a magnetic flux density from about 0.01 T to about 10 T, such as from about 0.1 T to about 1 T. In FIG. 5, there is a receiver sheet (ferromagnetic receiver material), a donor layer (austenite-phase-stabilizing donor material), and a laser configured for laser melting or laser ablation of the donor material. The ferromagnetic receiver material is the soft magnetic material being tailored. In FIG. 5, for purposes of this illustration, only a first surface region is depicted, not a second surface region. Preferably, the electromagnets and the ferromagnetic receiver material are configured such that when the electromagnetics are turned on, there are electromagnetic field lines passing through the donor material and passing through the first surface region being tailored. The electromagnetic field lines may also pass through the portions of ferromagnetic receiver material not being tailored, such as farther into the depth of the first surface regions, the second surface regions, etc. The electromagnetic field lines may intersect and pass through the laser.

In methods employing laser melting as well as application of an electromagnetic field, the electromagnetic field may be applied during step (c), during step (d), during step (e), and/or during step (f). In methods employing laser ablation as well as application of an electromagnetic field, the electromagnetic field may be applied during step (c), during step (d), and/or during step (e).

An electromagnetic field can be beneficial during laser melting and solidification of the austenite-phase-stabilizing donor material, and optionally laser melting and solidification of a portion of the ferromagnetic receiver material. The electromagnetic field may have advantages in terms of crystallographic structure, for example. See the section entitled "Microstructure Evolution and Control During Laser-Based Additive Manufacturing with Optional Electromagnetic Fields", later in this specification, for more detail. Also, U.S. Patent App. Publication No. 20220044870 A1, published on Feb. 10, 2022, is hereby incorporated by reference herein.

Some variations provide a soft magnet with surface-tailored magnetic permeability, wherein the soft magnet comprises:
  (i) a first region comprising a first core region and a first surface region, wherein the first core region contains a ferromagnetic material, and wherein the first surface region contains an austenite-phase-stabilizing donor material; and
  (ii) a second region comprising a second core region, wherein the second core region contains the ferromagnetic material, and wherein the second region does not contain the austenite-phase-stabilizing donor material;
wherein the first surface region has an average thickness from about 1 micron to about 3000 microns,
wherein the first region is characterized by a first average magnetic permeability,
wherein the second region is characterized by a second average magnetic permeability, and
wherein the first average magnetic permeability is higher than the second average magnetic permeability.

Certain embodiments provide a soft magnet with surface-tailored magnetic permeability, wherein the soft magnet comprises:
  (i) a first region comprising a first core region and a first surface region, wherein the first core region contains a ferromagnetic material, and wherein the first surface region contains a first concentration of an austenite-phase-stabilizing donor material; and
  (ii) a second region comprising a second core region and a second surface region, wherein the second core region contains the ferromagnetic material, wherein the second surface region contains a second concentration of the austenite-phase-stabilizing donor material, and wherein the second concentration of the austenite-phase-stabilizing donor material is lower than the first concentration of the austenite-phase-stabilizing donor material;
wherein the first surface region has an average thickness from about 1 micron to about 3000 microns,
wherein the first region is characterized by a first average magnetic permeability,
wherein the second region is characterized by a second average magnetic permeability, and
wherein the first average magnetic permeability is higher than the second average magnetic permeability.

Some variations provide a soft magnet produced by a process comprising:
  (a) providing a selected ferromagnetic receiver material;
  (b) providing a selected austenite-phase-stabilizing donor material;
  (c) depositing the selected austenite-phase-stabilizing donor material on one or more first surface regions of the ferromagnetic receiver material;
  (d) not depositing the selected austenite-phase-stabilizing donor material on one or more second surface regions of the ferromagnetic receiver material;
  (e) laser melting the selected austenite-phase-stabilizing donor material into the one or more first surface regions, to form molten austenite-phase-stabilizing donor material; and
  (f) solidifying the molten austenite-phase-stabilizing donor material, to form solid austenite-phase-stabilizing donor material that is situated within the one or more first surface regions, thereby selectively alloying the ferromagnetic receiver material in the one or more first surface regions,
thereby resulting in a soft magnet with surface-tailored magnetic permeability,
wherein the one or more first surface regions are characterized by a first average magnetic permeability following the selective alloying in step (f),
wherein the one or more second surface regions are characterized by a second average magnetic permeability, and
wherein the first average magnetic permeability is higher than the second average magnetic permeability.

Some variations provide a soft magnet produced by a process comprising:

(a) providing a selected ferromagnetic receiver material;
(b) providing a selected austenite-phase-stabilizing donor material;
(c) depositing the selected austenite-phase-stabilizing donor material on one or more first surface regions of the ferromagnetic receiver material;
(d) not depositing the selected austenite-phase-stabilizing donor material on one or more second surface regions of the ferromagnetic receiver material; and
(e) laser ablating the selected austenite-phase-stabilizing donor material into the one or more first surface regions, to force the selected austenite-phase-stabilizing donor material to penetrate into the one or more first surface regions, thereby selectively alloying the ferromagnetic receiver material in the one or more first surface regions, thereby resulting in a soft magnet with surface-tailored magnetic permeability,
wherein the one or more first surface regions are characterized by a first average magnetic permeability,
wherein the one or more second surface regions are characterized by a second average magnetic permeability, and
wherein the first average magnetic permeability is higher than the second average magnetic permeability.

In some soft magnets, the ferromagnetic material is selected from the group consisting of FeSi, FeNi, FeCo, NiCo, FeSiAl, and combinations thereof. Various stoichiometries are possible for any of these ferromagnetic materials. The elements making up the ferromagnetic material may be bonded together to form a molecule (compound), may be in solid solution together as a single-phase alloy, or may be present in a multiphase alloy.

It is understood that FeSi refers to $Fe_xSi_y$ compounds or alloys, wherein x and y can take on various values to form a compound or alloy of iron and silicon. When x=1 and y=1, the compound is iron monosilicide, $Fe_1Si_1$. When x=2 and y=1, the compound is diiron silicide, $Fe_2Si$. When x=1 and y=2, the compound is iron disilicide, $FeSi_2$, and so on. In some embodiments, the FeSi is a ferrosilicon alloy of iron and silicon with a silicon content by weight of about 1-20%, for example.

It is understood that FeNi refers to $Fe_xNi_y$ compounds or alloys, wherein x and y can take on various values to form a compound or alloy of iron and nickel. For example, FeNi may be a compound selected from $Fe_1Ni_1$, $Fe_2Ni$, $Fe_3Ni$, $FeNi_2$, or a combination thereof. In some embodiments, the FeNi is a ferronickel alloy of iron and nickel with a nickel content by weight of about 2-80%, for example.

It is understood that FeCo refers to $Fe_xCo_y$ compounds or alloys, wherein x and y can take on various values to form a compound or alloy of iron and cobalt. For example, FeCo may be a compound selected from $Fe_1Co_1$, $Fe_2Co$, $Fe_3Co$, or a combination thereof. In some embodiments, the FeCo is a ferrocobalt alloy of iron and cobalt with a cobalt content by weight of about 10-90%, for example.

It is understood that NiCo refers to $Ni_xCo_y$ compounds or alloys, wherein x and y can take on various values to form a compound or alloy of nickel and cobalt. For example, NiCo may be a compound selected from $Ni_1Co_1$, $Ni_2Co$, $NiCo_2$, or a combination thereof. In some embodiments, the NiCo is a nickel-cobalt alloy with a nickel content by weight of about 1% to about 99% and a cobalt content by weight of about 99% to about 1%, for example.

It is understood that FeSiAl refers to $Fe_xSi_yAl_z$ compounds or alloys, wherein x, y, and z can take on various values to form a compound or alloy of iron, silicon, and aluminum. In some embodiments, the FeSiAl is a ferrosilicon-aluminum alloy with a silicon content by weight of about 10% to about 40%, an aluminum content by weight of about 22% to about 55%, and the balance iron, for example.

In some soft magnets, the austenite-phase-stabilizing donor material is selected from the group consisting of Ni, Mn, Co, Cr, Si, Mo, Nb, Ti, Mg, Cu, Al, N, C, B, and combinations thereof. By "combinations" in this paragraph, it is meant that multiple elements may be utilized as austenite-phase-stabilizing donor materials, such as titanium (Ti) and nitrogen (N) separately, or that multiple elements are combined into a compound or alloy which is employed as the austenite-phase-stabilizing donor material, such as titanium nitride (TiN), or both types of combinations.

The soft magnet may contain multiple instances of the first region and/or the second region. In typical embodiments (see, for example, FIG. 6), there are multiple first regions and multiple second regions. Reference herein to a "first surface region" will be understood as reference also to multiple first surface regions, such as 2, 3, 4, 5, 6, 7, 8, 9, 10, or more individual first surface regions which have tailored magnetic properties. Likewise, reference herein to a "second surface region" will be understood as reference also to multiple second surface regions, such as 2, 3, 4, 5, 6, 7, 8, 9, 10, or more individual second surface regions which have tailored magnetic properties. The converse is also true; reference to the plural form "first surface regions" will be understood to refer to a single first surface region in certain embodiments that target one specific region for tailoring via alloy deposition. Finally, reference to the plural form "second surface regions" will be understood to refer to a single second surface region in certain embodiments that avoid alloy deposition and magnetic tailoring in one specific region.

In some soft magnets, there is solid austenite-phase-stabilizing donor material situated on or in one or more first surface regions (e.g., see FIGS. 8A and 8B). Ideally, there is perfect selectivity such that the first surface regions have a uniform concentration of austenite-phase-stabilizing donor material that has penetrated within those regions, while the second surface regions are entirely free of any austenite-phase-stabilizing donor material. Practically, perfect selectivity can be difficult to achieve. Some tolerance is usually acceptable, depending on the application of the soft magnet and its required magnetic properties. In particular, some austenite-phase-stabilizing donor material may be situated on or in one or more defective second surface regions; likewise, there may be defective first surface regions that do not have austenite-phase-stabilizing donor material situated on or in such defective regions. The austenite-phase-stabilizing donor material selectivity may be quantified as the percentage of austenite-phase-stabilizing donor material situated on or in the first surface regions, relative to all austenite-phase-stabilizing donor material situated on or in all surface regions of the ferromagnetic material. For example, if the austenite-phase-stabilizing donor material is perfectly situated on or in the first surface regions, and none of the donor material is situated on or in the second surface regions, then the austenite-phase-stabilizing donor material selectivity is 100%. If the austenite-phase-stabilizing donor material is erroneously situated on or in the second surface regions, and none of the donor material is correctly situated on or in the first surface regions, then the austenite-phase-stabilizing donor material selectivity is 0%. If there is a random distribution of donor material across all surface regions, and in the hypothetical case in which the first and second surface regions have equal collective volumes, then the austenite-phase-stabilizing donor material selectivity is 50%. Preferably, in the disclosed soft magnets, the austenite-phase-stabilizing donor material selectivity is at least 80%, more preferably at least 90%, and most preferably at least 91%, 92%, 93%, 94%, 95%, 96%, 97%, 98%, 99%, 99.5%, 99.9%, 99.95%, 99.99%, or 100%, including all intervening ranges.

Note that 0% selectivity with respect to the first surface regions is equivalent to 100% selectivity with respect to the second surface regions. By convention in this patent application, the first surface regions are those targeted for magnetic tailoring.

In certain alternative soft magnets, first surface regions have a first concentration of the austenite-phase-stabilizing donor material, and second surface regions have a second concentration of the austenite-phase-stabilizing donor material, wherein the second concentration is lower than the first concentration but higher than 0. In these embodiments, the selectivity (as defined in the preceding paragraph) should be higher than 50%, but need not approach 100%. In various embodiments of these alternative soft magnets, the austenite-phase-stabilizing donor material selectivity is at least 60%, preferably at least 70%, and more preferably at least 80%.

In some soft magnets, the one or more first surface regions may have an average thickness from about 1 micron to about 3000 microns, for example. In certain embodiments, the average thickness is from about 100 microns to about 500 microns. In various soft magnets, the average thickness is about, at least about, or at most about 1, 2, 5, 10, 25, 50, 75, 100, 150, 200, 250, 300, 400, 500, 600, 750, 1000, 1500, 2000, 2500, or 3000 microns, including any intervening range. The average thickness of the first surface regions is defined as the depth (units of length) that contains, on average, 99 wt % of the austenite-phase-stabilizing donor material. This definition is used to ignore stray or impurity donor elements, and to account for embodiments in which the donor material is primarily situated on top of the ferromagnetic material, embodiments in which the donor material is fully penetrated within the ferromagnetic material, and embodiments in which there is donor material both on top and penetrated within the ferromagnetic material. To illustrate, in FIG. 8A, it is estimated that 99 wt % of the Ni (donor material) is within a layer that has a thickness of approximately 175 μm. In the embodiment of FIG. 8A, there is donor nickel both on top of, and penetrated within, the ferromagnetic material, FeSi.

In some soft magnets, the austenite-phase-stabilizing donor material is situated within one or more first surface regions, not merely a coating disposed solely on top of the ferromagnetic material. A portion of the donor material may be situated on top of the first surface region. Preferably, at least a portion of the donor material is penetrated within the first surface region, such that the donor material is blended (uniformly or non-uniformly) with the ferromagnetic material. This is evident for example in FIG. 8B, where Ni (lighter dots) has clearly penetrated into, and is therefore situated in, the FeSi ferromagnetic material. Penetration of the austenite-phase-stabilizing donor material into the volume of the ferromagnetic material is believed to be beneficial for the magnetic properties.

In the first region of the soft magnet, the first surface region may have a thickness that is from about 0.1% to about 50% of the thickness of the first core region, for example.

Typically, the thickness of the first surface region is from about 0.5% to about 10% of the thickness of the first core region, unless there is deep penetration of the donor material, due to high laser power, for example. In various embodiments, the thickness of the first surface region, as a percentage of the thickness of the first core region, is about, at least about, or at most about 0.1%, 0.2%, 0.3%, 0.4%, 0.5%, 1%, 1.5%, 2%, 2.5%, 3%, 4%, 5%, 6%, 7%, 8%, 9%, 10%, 15%, 20%, 25%, 30%, 35%, 40%, 45%, or 50%, including all intervening ranges.

In some soft magnets, the first average magnetic permeability is at least 90% higher than the second average magnetic permeability. In certain soft magnets, the first average magnetic permeability is at least 99% higher than the second average magnetic permeability. In various soft magnets, the first average magnetic permeability is at least 50%, 60%, 70%, 80%, 90%, 99%, 100%, 150%, 200%, 300%, 400%, 500%, 600%, 700%, 800%, 900%, or 1000% higher than the second average magnetic permeability. When the first average magnetic permeability is 1000% higher than the second average magnetic permeability, there is a 10:1 contrast between magnetic permeabilities of the first surface regions compared to the second surface regions, which provides a beneficial soft magnet. The ratio of the first average magnetic permeability to the second average magnetic permeability is the "magnetic-permeability contrast" between the first surface regions and the second surface regions. In various embodiments, the magnetic-permeability contrast is about, or at least about, 10:1, 50:1, 100:1, 500:1, 1000:1, 2000:1, 5000:1, 10000:1, 20000:1, or 50000:1.

The soft magnet may be used in a rotor in an electric motor, for example. The high contrast between magnetic permeabilities in the first and second surface regions is very useful for rotors, especially rotors used in electric motors (e.g., for electric vehicles).

Figure 6:
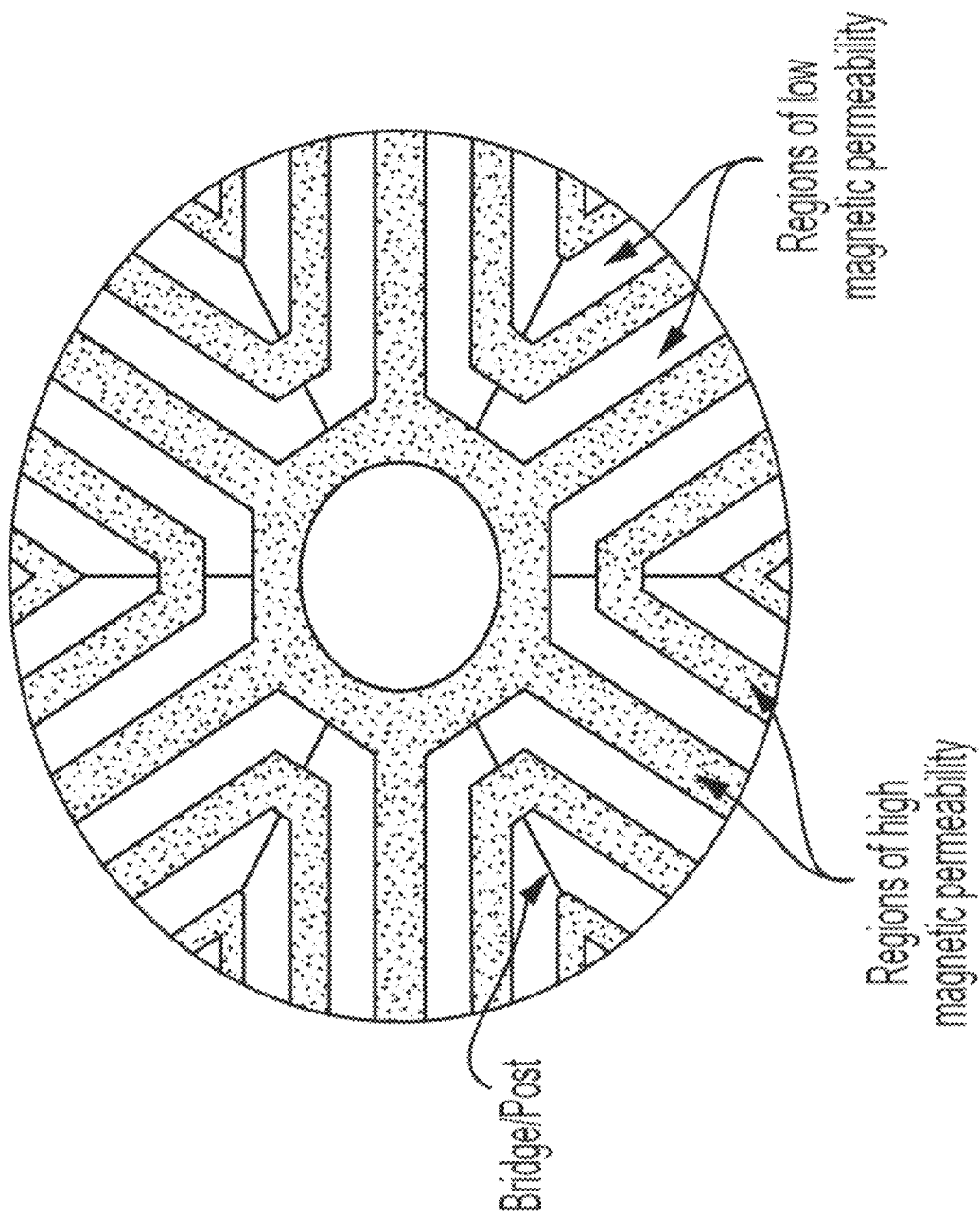
FIG. 6 is a schematic illustration of a soft magnet with surface-tailored magnetic permeability.

FIG. 6 is a schematic illustration of a soft magnet with surface-tailored magnetic permeability. In the soft magnet of FIG. 6, there are multiple regions of high magnetic permeability (shaded with dots), and multiple regions of low magnetic permeability (white). In some variations of FIG. 6, the shaded regions have first average magnetic permeability and the white regions have a second average magnetic permeability that is lower than the first average magnetic permeability, at various levels of magnetic-permeability contrast. In other variations of FIG. 6, there are two different low-magnetic-permeability regions. One of the low-magnetic-permeability regions is air, shaded white. The other of the low-magnetic-permeability regions is formed from bridges and posts that connect high-magnetic-permeability regions, which are shaded with dots. In these variations, the bridges and posts are depicted as solid lines (labeled as "Bridge/Post" in FIG. 6) that connect the high-magnetic-permeability regions. Various levels of magnetic-permeability contrast between the high-magnetic-permeability regions bridges and posts are possible, such as 10000:1 or even higher.

Microstructure Evolution and Control During Laser-Based Additive Manufacturing with Optional Electromagnetic Fields Current manufacturing methods (e.g. press and sinter methods) are inherently limited in geometries by the shape of the die (often prismatic) and eventual loss of net shape due to shrinkage during sintering. By contrast, laser-based additive manufacturing enables fabrication of complex three-dimensional geometries without the cost and loss of material associated with subtractive manufacturing methods, such as machining into a final net shape.

Additive manufacturing provides control of crystallographic orientation. The resultant crystallographic orientation of a grain is dependent on several contributing thermodynamic driving forces. One such factor is the direction of the maximum thermal gradient, in which solidifying cubic crystals tend to preferentially grow with a <100> orientation, for example. The thermal gradient can be controlled using a laser scan strategy by locally heating with a variety of spatially and/or temporally varying patterns. The formation of crystallographic texture can also be tailored during solidification and subsequent solid-state transformations through the application of an external magnetic field, potentially producing more texture uniformity with specified locality and direction.

In some embodiments, the magnetic performance is improved by controlling crystallographic orientation (texture) of the grains in addition to the magnetization orientation in the microstructure. This control is especially powerful when crystallographic texture and magnetic orientation are both tailored in a synergistic way during additive manufacturing. To this end, the grains may be crystallographically oriented in the (or a) direction that allows the highest remanent magnetization; simultaneously, a magnetic field may be applied to orient the magnetization in that same direction. The result is a magnet with optimal crystallographic and magnetic orientation and therefore the maximum energy product. Magnetic materials may also be optimized by 3D optimization of crystallographic texture in regions susceptible to demagnetization. By employing additive manufacturing, local thermal, magnetic, and stress fields may be manipulated in the production of magnetic materials having selected crystallographic texture(s) with location specificity.

Additive manufacturing provides the opportunity to tailor local structure voxel-by-voxel in a serial, layered process. A processed voxel is the volume affected by heat input from the direct energy source in a layer-based approach, which volume includes the melt pool as well as the surrounding heat-affected zone. The solidification crystallographic texture may be controlled by the direction of heat extraction. In addition to the thermal field, a magnetic field may be applied during processing to control both crystallographic texture and magnetization orientation. The external magnetic field may be generated by means of an induction coil, multiple induction coils, a permanent magnet, or an array of permanent magnets, for example.

In this specification, additive manufacturing may be utilized in a wide variety of ways. In a soft magnet with surface-tailored magnetic permeability, the one or more first surface regions may be additively manufactured using laser melting and solidification of the donor material. Also, it is possible to additively manufactured the entire soft magnet, including the ferromagnetic material. While the bulk alloy in FIG. 1 in illustrated as having a simply rectangular geometry, that is solely for purposes of illustration. By using additive manufacturing of the bulk alloy, arbitrary 3D shapes may be fabricated. The additive manufacturing (also known as 3D printing) of the ferromagnetic receiver material may be performed prior to depositing the donor material (alloy elements). Alternatively, the additive manufacturing of the ferromagnetic receiver material may be performed simultaneously with depositing the donor material, and prior to laser melting or laser ablation of the donor material. For example, the donor-material deposition may be integrated into the additive manufacturing of the ferromagnetic receiver material, or may be another step construed also as additive manufacturing. In certain embodiments, the fabrication of the ferromagnetic receiver material, the deposition of the donor material selectively on one or more first surface regions, the laser melting/solidification and/or the laser ablation, are all integrated into an additive-manufacturing process. In this section, the discussion of microstructures and texture control may apply to any region of a soft magnet that is additively manufactured.

Some embodiments enable control of solidification of additively manufactured or welded microstructures on the order of the single domain limit (e.g., about 1-5 μm) to maximize the resistance to demagnetization, in addition to controlling the orientation of the easy axis (or at least one easy axis when there are more than one). Certain embodiments utilize the advantages of easy-axis alignment in magnet regions of interest (e.g. surfaces or corners) in order to improve overall resistance to demagnetization in a bulk magnet. Certain embodiments increase the total energy product of additively manufactured or welded magnets by controlling electromagnetic fields to manipulate solidification.

By manufacturing a magnet additively, with laser melting and solidification in each layer taking place voxel by voxel, the magnetic orientation of each voxel may be independently aligned. Independent voxel alignment may be achieved by applying a magnetic field during additive manufacturing, such as during the cooling processes (including solidification and solid-state transformations) of each voxel. The magnetic orientation of each voxel may be set independently of all other voxels, if desired.

In some embodiments, the magnetic orientations are arranged in order to create fields having certain regions of concentrated magnetic flux. These embodiments are beneficial to resist demagnetization in certain regions, or to optimize air-gap magnetic flux in the case of torque generation for motors, for example. Near sharp geometric features (e.g., edges), high flux densities may be encountered at non-optimal angles, causing nucleation of a reverse domain that leads to partial or complete demagnetization of the magnet. In order to resist this early demagnetization, orientation of the magnetic alignment may be selected or adjusted to optimize the angle between crystallographic and magnetic orientations of susceptible regions. Some embodiments consider the Wigner-Seitz angular dependency of magnetic coercivity. Advantages of some embodiments include the possibility of utilizing stronger external fields as well as higher temperatures.

Magnet material cost constitutes up to 70% of the total cost of an electric motor and is a limiting factor to wide-scale adoption of electric vehicles. Magnet costs can be significantly improved by using additive manufacturing to create a near-net-shape product, thereby incurring minimal material waste upon fabrication.

In addition, by improving the demagnetization resistance of magnetic architectures through tailored crystallographic textures, the mass and volume efficiency of magnets may be increased, thereby reducing the amount of material required for matching performance efficiency of a motor or other magnet application. This benefit, in combination with the ability to produce optimized magnet shapes to optimize field utility, may improve magnet motor efficiencies in addition to decreasing the overall cost to manufacture.

Epitaxial dendritic solidification tends to grow in the direction of the largest thermal gradient. However, when there is externally applied magnetic field, the solidification direction can become unaligned with the maximum thermal gradient. Adjustment of the electromagnetic field direction influences texture evolution and provides an additional lever different from the dendritic solidification direction.

A magnetically susceptible material is a material that will become magnetized in an applied magnetic field. Magnetic susceptibility indicates whether a material is attracted into or repelled out of a magnetic field. Paramagnetic materials align with the applied field and are attracted to regions of greater magnetic field. Diamagnetic materials are anti-aligned and are pushed toward regions of lower magnetic fields. On top of the applied field, the magnetization of the material adds its own magnetic field. The magnetizability of materials arises from the atomic-level magnetic properties of the particles of which they are made, typically being dominated by the magnetic moments of electrons.

The "magnetic axis" is the straight line joining two poles of a magnetized body. The torque exerted on the magnet by a magnetic field in the direction of the magnetic axis equals 0. The "crystallographic texture" is the distribution of crystallographic orientations of a polycrystalline material. A "crystallographic orientation" is defined by the plane (Miller) indices of the lattice plane of a crystal.

In some embodiments, a magnetic-field orientation is selected to control the crystallographic texture but not necessarily the magnetic axis within a magnetic metal layer. In some embodiments, a magnetic-field orientation is selected to control the magnetic axis but not necessarily the crystallographic texture within a magnetic metal layer. In certain embodiments, a magnetic-field orientation is selected to control both the crystallographic texture as well as the magnetic axis within a magnetic metal layer.

The energy source for additive manufacturing may be a laser beam, an electron beam, or both a laser beam and an electron beam. The energy source preferably imposes a thermal gradient that melts a portion of the feedstock composition in a scan direction, rather than bulk melting the entire feedstock composition. In some embodiments, additive manufacturing utilizes a technique selected from the group consisting of selective laser melting, electron beam melting, laser engineered net shaping, selective laser sintering, direct metal laser sintering, integrated laser melting with machining, laser powder injection, laser consolidation, direct metal deposition, directed energy deposition, plasma arc-based fabrication, ultrasonic consolidation, electric arc melting, welding, and combinations thereof.

An additively manufactured object may contain a plurality of voxels. A "voxel" is a volumetric (3D) pixel. A plurality of voxels forms a single layer having a thickness defined by the voxel height. In some embodiments, the individual voxels are defined by a characteristic voxel length scale selected from about 50 microns to about 1000 microns. In certain embodiments, the characteristic voxel length scale is selected from about 100 microns to about 500 microns. An exemplary voxel is on the order of 100 µm×100 µm×100 µm. Another exemplary voxel is on the order of 10 µm×10 µm×10 µm.

A voxel may be cubic in geometry, but that is not necessary. For example, a voxel may be rectangular or may have an irregular shape. For an arbitrary voxel geometry, there is a characteristic voxel length scale that is equivalent to the cube root of the average voxel volume. The characteristic voxel length scale may be about, at least about, or at most about 1, 2, 3, 4, 5, 6, 7, 8, 9, 10, 15, 20, 25, 30, 40, 50, 75, 100, 125, 150, 200, 250, 300, 350, 400, 450, 500, 600, 700, 800, 900, or 1000 microns, including all intervening ranges (e.g., 100-500 microns). The characteristic voxel length scale is typically a function of the laser or electron beam intensity, beam diameter, scan speed, and properties (e.g., kinematic viscosity) of the material being fabricated.

In some embodiments of additive manufacturing, there is solidification of individual voxels and the magnetic field may be varied voxel-by-voxel, if desired. Using a highly localized energy source, and potentially using different compositions during fabrication, small voxels of a structure can be created with specific crystal orientations and magnetic properties, independently of other voxels.

Depending on the intensity of the energy delivered, each voxel may be created by melting and solidification of a starting feedstock or by sintering or other heat treatment of a region of material, for example. During solidification, a molten form of a voxel produces one or more solid grains with individual crystal structures. In some embodiments, solidified voxels contain single grains. In other embodiments, solidified voxels contain a plurality of grains having some distribution of crystallographic orientations and magnetic orientations. Geometrically, an individual voxel may be the same size as an individual grain, or may be larger than an average grain size within a magnetic metal layer. In various embodiments, an average voxel contains about, at least about, or at most about 1, 1.5, 2, 2.5, 3, 4, 5, 6, 7, 8, 9, 10, 15, 20, 25, 50, 75, or 100 grains, including all intervening ranges.

When a voxel contains a plurality of grains each having its own crystallographic orientation and magnetic easy axis, the voxel will have a voxel-average crystallographic orientation and a voxel-average magnetic easy axis. In some embodiments, a voxel is configured such that all grains have the same or similar crystallographic orientations and/or magnetic easy axes. In other embodiments, a voxel is configured such that individual grains have different crystallographic orientations and/or magnetic easy axes.

A magnetic metal layer from additive manufacturing has crystallographic texture arising from individual grains which, in turn, form voxels. There is a magnetic easy axis for each grain, an average magnetic easy axis for each voxel, and an average magnetic easy axis for the magnetic metal layer. There may be varying degrees of alignment between these hierarchical magnetic easy axes.

In certain embodiments, a voxel contains a plurality of grains with a narrow crystallographic orientation distribution along the easy axis of the crystal as well as co-aligned magnetic domains contained within each grain. This co-alignment produces the maximum total remanent magnetic flux for the voxel. In a larger structure with a plurality of voxels, there may be a narrow crystallographic orientation distribution along the easy axis as well as co-aligned magnetic domains contained within each voxel. This co-alignment produces the maximum total remanent magnetic flux for the structure.

The grain sizes may vary widely, such as from about 0.1 microns to about 1000 microns. In various embodiments, the average grain size (within a given voxel or within the overall structure) may be about, at least about, or at most about 0.1, 0.2, 0.3, 0.4, 0.5, 0.6, 0.7, 0.8, 0.9, 1, 1.5, 2, 2.5, 3, 3.5, 4, 5, 6, 7, 8, 9, 10, 15, 20, 25, 30, 35, 40, 45, 50, 75, 100, 125, 150, 200, 250, 300, 350, 400, 500, 600, 700, 800, 900, or 1000 microns.

Grain sizes may be measured by a variety of techniques, including dynamic light scattering, laser diffraction, or image analysis, for example. Dynamic light scattering is a non-invasive, well-established technique for measuring the size and size distribution of particles typically in the sub-micron region, and with the latest technology down to 1 nanometer. Laser diffraction is a widely used particle-sizing technique for materials ranging from hundreds of nanometers up to several millimeters in size. Exemplary dynamic light scattering instruments and laser diffraction instruments for measuring particle sizes are available from Malvern Instruments Ltd., Worcestershire, UK. Image analysis to estimate grain sizes and distributions can be done directly on photomicrographs, scanning electron micrographs, or other images.

In some embodiments, the magnetic-field orientation is selected to control voxel-specific magnetic axes within the plurality of individual voxels contained within a magnetic metal layer. In these or other embodiments, the magnetic-field orientation is selected to control voxel-specific crystallographic textures within the plurality of individual voxels contained within a magnetic metal layer.

When a plurality of solid layers is generated by sequentially solidifying a plurality of melt layers in a build direction, the magnetic-field orientation may be adjusted in the build direction. In other words, the magnetic-field orientation may be different for one layer versus another layer, in addition to variations of the magnetic-field orientation within a layer (voxel-specific magnetic-field orientations).

The atomic structure of a crystal introduces preferential directions for magnetization. This is referred to as magnetocrystalline anisotropy. A "magnetic easy axis" is a direction inside a crystal, along which a small applied magnetic field is sufficient to reach the saturation magnetization. There can be a single easy axis or multiple easy axes. A "magnetic hard axis" is a direction inside a crystal, along which a large applied magnetic field is needed to reach the saturation magnetization. There will be a magnetic easy axis and a magnetic hard axis whether or not a magnetic field is actually being applied. The magnetic easy axis is different from the magnetic axis. A magnetic axis is only present when a magnetic field is actually applied, whereas a magnetic easy axis is a fixed property of a given crystalline material.

In some embodiments, the magnetic-field orientation may be selected to control voxel-specific magnetic easy axes within the plurality of individual voxels contained within the magnetic metal layer.

In some embodiments, individual voxels are substantially magnetically aligned with each other, in reference to the magnetic easy axes of each voxel within a given magnetic metal layer. By "substantially magnetically aligned" is it meant that there is a standard deviation that is less than 25°, less than 20°, less than 10°, or less than 5°, calculated based on all of the magnetic easy axes within the magnetic metal layer. In certain embodiments, all magnetic easy axes are substantially aligned, such that the standard deviation is less than 2°, less than 1°, less than 0.5°, less than 0.1°, or about 0°. Remanence measurements may be used to determine the alignment of magnetic easy axes. See McCurrie, "Determination of the degree of easy axis alignment in uniaxial permanent magnets from remanence measurements" *Journal of Applied Physics* 52, 7344 (1981), which is hereby incorporated by reference.

In some embodiments, the magnetic-field orientation is selected to control voxel-specific magnetic axes as well as voxel-specific magnetic easy axes within the plurality of individual voxels contained within a magnetic metal layer, wherein the voxel-specific magnetic axes are substantially aligned with the voxel-specific magnetic easy axes for at least a portion of the magnetic metal layer. In certain embodiments, the voxel-specific magnetic axes are substantially aligned with the voxel-specific magnetic easy axes for all of a magnetic metal layer.

In other embodiments, the magnetic-field orientation is selected to control voxel-specific magnetic axes as well as voxel-specific magnetic easy axes within the plurality of individual voxels contained within a magnetic metal layer, wherein the voxel-specific magnetic axes are configured to be at angles with the voxel-specific magnetic easy axes for at least a portion of the magnetic metal layer.

In some methods, conditions of additive manufacturing are controlled such that thermal gradients assist in generating the crystallographic texture within the magnetic metal layer.

In some embodiments, different feedstock compositions, each comprising one or more magnetic or magnetically susceptible materials, are exposed to the energy source. The crystallographic texture may be adjusted during additive manufacturing. Different feedstock compositions may be not only different species, but also different concentrations of the same species.

Different feedstock compositions enable the fabrication of graded compositions. For instance, the concentration of magnetic rare earth elements may be adjusted throughout a magnetic structure. One example employs local doping of Dy, Nd, or Yb in areas that are susceptible to demagnetization. Local doping may be achieved via spray additive processes, for example.

Some embodiments optimize the crystallographic texture site-specifically throughout the volume of the soft magnet. In contrast to conventionally processed magnetic materials with a single easy axis orientation, or a narrow distribution of easy axis orientations, texture-controlled magnets disclosed herein may possess easy axis orientations tailored to resist demagnetizing fields in regions of high susceptibility of demagnetization. Such regions may exist where demagnetizing field concentration is high and/or where orientations with respect to the magnetic field direction change rapidly, such as at corners.

Interfaces between domains are susceptible to domain reversal (demagnetization) due to a relatively low barrier to nucleation. Optimal easy axis orientations with respect to the external magnetic field preferably increase the energy barrier to nucleation of a reverse magnetic domain, thereby preserving magnetization. For example, by matching a single magnetic domain with a single grain, the resistance to domain reversal within that grain is minimized, raising the energy barrier to nucleation of a reverse domain.

In some embodiments, without limitation, an additive-manufacturing feedstock is a powder that is surface-functionalized with a plurality of nanoparticles. The nanoparticles may promote heterogeneous nucleation in the melt pool to induce equiaxed grain growth. In some embodiments, the nanoparticles are magnetic or magnetically susceptible and become magnetically aligned during solidification to produce a crystallographic texture dictated by an external magnetic field. Alternatively, or additionally, the nanoparticles—whether or not they are magnetic or magnetically susceptible—may induce growth of a magnetic phase which could then be magnetically aligned with the magnetic-field direction.

Generally speaking, the base particles and/or the surface-modifying particles may be selected from the group consisting of Al, Si, Fe, Cu, Ni, Mn, Mg, Cr, Zn, V, Ti, Bi, Ga, Pb, Zr, H, Li, Be, B, C, N, O, F, Na, P, S, Cl, K, Ca, Sc, Co, Zn, Ga, Ge, As, Se, Br, Rb, Sr, Y, Nb, Mo, Tc, Ru, Rh, Pd, Ag, Cd, In, Sn, Te, I, Cs, Ba, Hf, Ta, W, Re, Os, Ir, Pt, Au, Hg, Tl, Ce, Nd, and combinations thereof, for example.

In general, the geometry of the feedstock composition is not limited and may be, for example, in the form of powder particles, wires, rods, bars, plates, films, coils, spheres, cubes, prisms, cones, irregular shapes, or combinations thereof. In certain embodiments, the feedstock composition is in the form of a powder, a wire, or a combination thereof (e.g., a wire with powder on the surface). When the feedstock composition is in the form of powder, the powder particles may have an average diameter from about 1 micron to about 500 microns, such as about 10 microns to about 100 microns, for example. When the feedstock composition is in the form of a wire, the wire may have an average diameter from about 10 microns to about 1000 microns, such as about 50 microns to about 500 microns, for example.

The energy source for additive manufacturing may be provided by a laser beam, an electron beam, alternating current, direct current, plasma energy, induction heating from an applied magnetic field, ultrasonic energy, other sources, or a combination thereof. Typically, the energy source is a laser beam.

Selective laser melting utilizes a laser (e.g., Yb-fiber laser) to provide energy for melting. Selective laser melting is designed to use a high power-density laser to melt and fuse metallic powders together. The process has the ability to fully melt the metal material into a solid 3D part. A combination of direct drive motors and mirrors, rather than a fixed optical lens, may be employed. An inert atmosphere is usually employed. A vacuum chamber can be fully purged between build cycles, allowing for lower oxygen concentrations and reduced gas leakage. Selective laser melting is a type of powder bed-based additive manufacturing.

Electron beam melting uses a heated powder bed of metal that is then melted and formed layer by layer, in a vacuum, using an electron beam energy source similar to that of an electron microscope. Metal powder is welded together, layer by layer, under vacuum. Electron beam melting is another type of powder bed-based additive manufacturing.

Laser engineering net shaping is a powder-injected technique operates by injecting metal powder into a molten pool of metal using a laser as the energy source. Laser engineered net shaping is useful for fabricating metal parts directly from a computer-aided design solid model by using a metal powder injected into a molten pool created by a focused, high-powered laser beam. Laser engineered net shaping is similar to selective laser sintering, but the metal powder is applied only where material is being added to the part at that moment. Note that "net shaping" is meant to encompass "near net" fabrication.

Direct metal laser sintering process works by melting fine powders of metal in a powder bed, layer by layer. A laser supplies the necessary energy and the system operates in a protective atmosphere, typically of nitrogen or argon.

Another approach utilizes powder injection to provide the material to be deposited. Instead of a bed of powder that is reacted with an energy beam, powder is injected through a nozzle that is then melted to deposit material. The powder may be injected through an inert carrier gas or by gravity feed. A separate shielding gas may be used to protect the molten metal pool from oxidation.

Directed energy deposition utilizes focused energy (either an electron beam or laser beam) to fuse materials by melting as the material is being deposited. Powder or wire feedstock can be utilized with this process. Powder-fed systems, such as laser metal deposition and laser engineered net shaping, blow powder through a nozzle, with the powder melted by a laser beam on the surface of the part. Laser-based wirefeed systems, such as laser metal deposition-wire, feed wire through a nozzle with the wire melted by a laser, with inert gas shielding in either an open environment (gas surrounding the laser), or in a sealed gas enclosure or chamber.

Powder bed-based additive manufacturing is preferred for its ability to produce near-net-shape products as well as the smaller tailorable voxel size (such as about 200 µm or less) compared to directed energy deposition (conventionally >500 µm).

Some embodiments utilize wire feedstock and an electron beam heat source to produce a near-net shape part inside a vacuum chamber. An electron beam gun deposits metal via the wire feedstock, layer by layer, until the part reaches the desired shape. Then the part optionally undergoes finish heat treatment and machining. Wire can be preferred over powder for safety and cost reasons.

In some embodiments, an additively manufactured magnet or magnet region has a microstructure with a crystallographic texture that is not solely oriented in the additive-manufacturing build direction. For example, solid layers may have differing primary growth-direction angles with respect to each other.

Additive manufacturing is not limited in principle to the number of solid layers that may be fabricated. The number of individual solid layers may be at least 2 layers, such as at least 10 individual solid layers. The number of solid layers may be much greater than 10, such as about 100, 1000, or more. In the case of welding or single-layer manufacturing, there may be a single layer in the final structure.

The plurality of additively manufactured solid layers may be characterized by an average layer thickness of at least 10 microns, such as about 10, 20, 30, 40, 50, 75, 100, 150, or 200 microns, for example.

Each solid layer may contain a number of voxels. In a special case for a substantially vertical build (e.g., a narrow column), there may be a single voxel per layer. The average number of voxels per layer may be about, at least about, or at most about 2, 3, 4, 5, 10, 20, 30, 40, 50, 100, 150, 200, 300, 400, 500, 600, 700, 800, 900, or 1000, including all intervening ranges, for example.

A magnetic metal layer may be characterized by a microstructure with equiaxed grains. For example, the soft-magnet first region, containing a first core region with ferromagnetic material and a first surface region with a donor material, may contain equiaxed grains. The equiaxed grains may be grains of the donor material, grains of the ferromagnetic material, or grains that contain both the donor material and the ferromagnetic material.

A microstructure that has "equiaxed grains" means that at least 90 vol %, preferably at least 95 vol %, and more preferably at least 99 vol % of the metal alloy contains grains that are roughly equal in length, width, and height. In some embodiments, at least 99 vol % of the magnet contains grains that are characterized in that there is less than 25%, preferably less than 10%, and more preferably less than 5% standard deviation in each of average grain length, average grain width, and average grain height. Equiaxed grains may result when there are many nucleation sites arising from certain grain-refining nanoparticles contained in the microstructure.

The surface-modifying particles of some embodiments are grain-refining nanoparticles. The grain-refining nanoparticles are preferably present in a concentration of at least 0.01 vol %, such as at least 0.1 vol %, at least 1 vol %, or at least 5 vol % of the feedstock composition. In various embodiments, the grain-refining nanoparticles are present in a concentration of about, or at least about, 0.1, 0.2, 0.5, 1, 2, 3, 4, 5, 6, 7, 8, 9, or 10 vol %.

In some embodiments, the grain-refining nanoparticles are lattice-matched to within ±5% compared to an otherwise-equivalent material containing the base particles but not the grain-refining nanoparticles. In certain embodiments, the grain-refining nanoparticles are lattice-matched to within ±2% or within ±0.5% compared to a material containing the base particles but not the grain-refining nanoparticles.

Nanoparticles are particles with the largest dimension between about 1 nm and about 5000 nm. A preferred size of nanoparticles is about 2000 nm or less, about 1500 nm or less, or about 1000 nm or less. In some embodiments, nanoparticles are at least 50 nm in size. In various embodiments, the average nanoparticle size is about 2, 5, 10, 25, 50, 100, 200, 300, 400, 500, 1000, 2000, 3000, 4000, or 5000 nanometers. Microparticles are particles with the largest dimension between about 1 micron and 1000 microns. The nanoparticle or microparticle size may be selected based on the desired properties and function of the final magnet.

Nanoparticles or microparticles may be spherical or of arbitrary shape with the largest dimension typically not exceeding the above largest dimensions. The nanoparticles or microparticles may include a coating of one or more layers of a different material. Mixtures of nanoparticles and microparticles may be used. In some embodiments, microparticles themselves are coated with nanoparticles, and the microparticle/nanoparticle composite is incorporated as a coating or layer on base particles.

The number of nanoparticles per microparticle can vary widely. The average number of individual nanoparticles disposed on one microparticle (equivalently, the average number ratio of nanoparticles to powder microparticles) may be about 10, about 102, about 103, about 104, about 105, or about 106, for example. The nanoparticle distribution on a feedstock particle surface can vary. In some embodiments, surface regions contain a relatively higher concentration of nanoparticles, which may be agglomerated at the surface in those regions.

The nanoparticle surface coverage may also vary widely, from about 1% to 100%, in various embodiments. The nanoparticle surface coverage is the average area fraction of feedstock particles that is covered by assembled nanoparticles. For example, the nanoparticle surface coverage may be about, or at least about, 1%, 5%, 10%, 20%, 30%, 40%, 50%, 60%, 70%, 80%, 90%, or 100%. Due to the small size of nanoparticles, benefits are possible with less than 1% surface area coverage.

In some embodiments, at least 1% of the surface area of the microparticles contains nanoparticles that are chemically and/or physically disposed on the microparticle surfaces. When higher nanoparticle concentrations are desired in the final material, it is preferred that a higher surface area of the microparticles contains nanoparticles. In various embodiments, at least 1%, 2%, 5%, 10%, 20%, 30%, 40%, 50%, 60%, 70%, 80%, 90%, or 95% of the total surface area of the microparticles contains nanoparticles that are chemically and/or physically disposed on the microparticle surfaces.

In some embodiments, the microparticles have an average microparticle size from about 1 micron to about 1 centimeter. In various embodiments, the average microparticle size is about 5 microns, 10 microns, 50 microns, 100 microns, 200 microns, 500 microns, 1 millimeter, 5 millimeters, or 10 millimeters.

The nanoparticles or microparticles are typically a different composition than the base particles. Nanoparticles or microparticles may include metals, hydrides, carbides, nitrides, borides, oxides, intermetallics, or other materials which upon processing form one or more of the aforementioned materials.

In some embodiments, surface functionalization is in the form of a continuous coating or an intermittent coating. A continuous coating covers at least 90% of the surface, such as about 95%, 99%, or 100% of the surface (recognizing there may be defects, voids, or impurities at the surface). An intermittent coating is non-continuous and covers less than 90%, such as about 80%, 70%, 60%, 50%, 40%, 30%, 20%, 10%, 5%, 2%, 1%, or less of the surface. An intermittent coating may be uniform (e.g., having a certain repeating pattern on the surface) or non-uniform (e.g., random).

In general, a functionalization coating may be continuous or discontinuous. The coating may have several characteristic features. In one embodiment, the coating may be smooth and conformal to the underlying surface. In another embodiment, the coating may be nodular. The nodular growth is often characteristic of kinetic limitations of nanoparticle assembly. For example, the coating may look like cauliflower or a small fractal growing from the surface. These features can be affected by the underling materials, the method of coating, reaction conditions, etc.

A coating may or may not be in the form of nanoparticles or microparticles. That is, the coating may be derived from nanoparticles or microparticles, and discrete nanoparticles or microparticles may no longer be present. Various coating techniques may be employed, such as (but not limited to) electroless deposition, immersion deposition, or solution coating. The coating thickness is preferably less than about 20% of the underlying particle diameter, such as less than 15%, 10%, 5%, 2%, or 1% of the underlying particle diameter.

In some embodiments, the surface functionalization also includes direct chemical or physical modification of the surface of the powder materials, such as to enhance the bonding of the nanoparticles or microparticles. Direct chemical modification of the surface of the powder materials, such as addition of molecules, may also be utilized to affect the solidification behavior of the powder materials. A plurality of surface modifications described herein may be used simultaneously.

The selection of composition will be dependent on the desired magnet properties and should be considered on a case-by-case basis. Someone skilled in the art of material science or metallurgy will be able to select the appropriate materials for the intended use, based on the information provided in this disclosure.

Nanoparticles or microparticles may be attached using electrostatic forces, Van der Waals forces, chemical bonds, physical bonds, and/or any other force. A chemical bond is the force that holds atoms together in a molecule or compound. Electrostatic and Van der Waals forces are examples of physical forces that can cause bonding. A physical bond is a bond that arises when molecular entities become entangled in space. Typically, chemical bonds are stronger than physical bonds. Chemical bonds may include ionic bonds, covalent bonds, or a combination thereof.

In some embodiments, the surface-modifying particles have an average particles size of 10 microns or less, such as an average particles size of 1 micron or less. The surface-modifying particles may be spherical, non-spherical (e.g., pyramidal or cubic), or random in shape.

Preferably, the microstructure of the additively manufactured magnet is substantially crack-free. The avoidance of cracks can be important for magnets. For example, samarium-cobalt magnets are brittle and prone to cracking and chipping. Crack-free SmCo-based soft magnets may be fabricated using the principles of this disclosure.

A magnet microstructure that is "substantially crack-free" means that at least 99.9 vol % of the metal alloy contains no linear or tortuous cracks that are greater than 0.1 microns in width and greater than 10 microns in length. In other words, to be considered a crack, a defect must be a void space that is at least 0.1 microns in width as well as at least 10 microns in length. A void space that has a length shorter than 10 microns but larger than 1 micron, regardless of width, can be considered a porous void (see below). A void space that has a length of at least 10 microns but a width shorter than 0.1 microns is a molecular-level gap that is not considered a defect.

Typically, a crack contains open space, which may be vacuum or may contain a gas such as air, $CO_2$, $N_2$, and/or Ar. A crack may also contain solid material different from the primary material phase of the metal alloy. The non-desirable material disposed within the crack may itself contain a higher porosity than the bulk material, may contain a different crystalline (or amorphous) phase of solid, or may be a different material altogether, arising from impurities during fabrication, for example.

The magnet microstructure may be substantially free of porous defects, in addition to being substantially crack-free. "Substantially free of porous defects" means at least 99 vol % of the magnet contains no porous voids having an effective diameter of at least 1 micron.

Preferably, at least 80 vol %, more preferably at least 90 vol %, even more preferably at least 95 vol %, and most preferably at least 99 vol % of the magnet contains no porous voids having an effective diameter of at least 1 micron. A porous void that has an effective diameter less than 1 micron is not typically considered a defect, as it is generally difficult to detect by conventional non-destructive evaluation. Also preferably, at least 90 vol %, more preferably at least 95 vol %, even more preferably at least 99 vol %, and most preferably at least 99.9 vol % of the metal alloy contains no larger porous voids having an effective diameter of at least 5 microns.

Typically, a porous void contains open space, which may be vacuum or may contain a gas such as air, $CO_2$, $N_2$, and/or Ar. Porous voids may be reduced or eliminated, in some embodiments. For example, additively manufactured metal parts may be hot-isostatic-pressed to reduce residual porosity, and optionally to arrive at a final additively manufactured magnet that is substantially free of porous defects in addition to being substantially crack-free.

In additive manufacturing, post-production processes such as heat treatment, light machining, surface finishing, coloring, stamping, or other finishing operations may be applied. Also, several additive manufactured parts may be joined together chemically or physically to produce a final magnet.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

EXAMPLES

Example 1: FeSi Magnet with Laser-Melted Ni on the Surface to Selectively Tailor the Magnetic Permeability This experiment utilizes a laser welder chamber. Nickel (Ni) foil is laid on top of and wrapped around a FeSi sheet. The FeSi sheet, sized down to a width of about 4.8 millimeters, is placed on a linear actuator. The sample is brought into the focus plane of the laser, which is a YAG (yttrium aluminum garnet, $Y_3Al_5O_{12}$) laser operating at 1064 nm. The laser power is set to 1000 W at a spot size of 200 μm, resulting in an energy density of 0.03 W/μm² at the surface of the sample. The firing speed of the laser is set to 6 Hz so that the sample is carried by the linear actuator under the laser, creating line scans. This technique simulates automated processes with dynamic laser beams such as those found in 3D printers. Line scans are then overlapped to form area scans. As the laser makes contact with the Ni foil, the nickel melts into the surface of the FeSi sheet, effectively surface-alloying the FeSi. The nickel functions as an austenite-phase-stabilizing material to selectively tailor the FeSi magnetic permeability.

This experiment is done both in the presence of an electromagnetic field, as well as without an electromagnetic field. Two electromagnets are wired together to act as a north (N) and south (S) magnetic pole. The electromagnet N—S pair is spaced apart about 6.4 millimeters, with the aid of magnetic flux concentrators, to achieve a magnetic field strength causing a magnetic flux density of about 0.6 T in the experiment with an electromagnetic field present.

Figure 7:
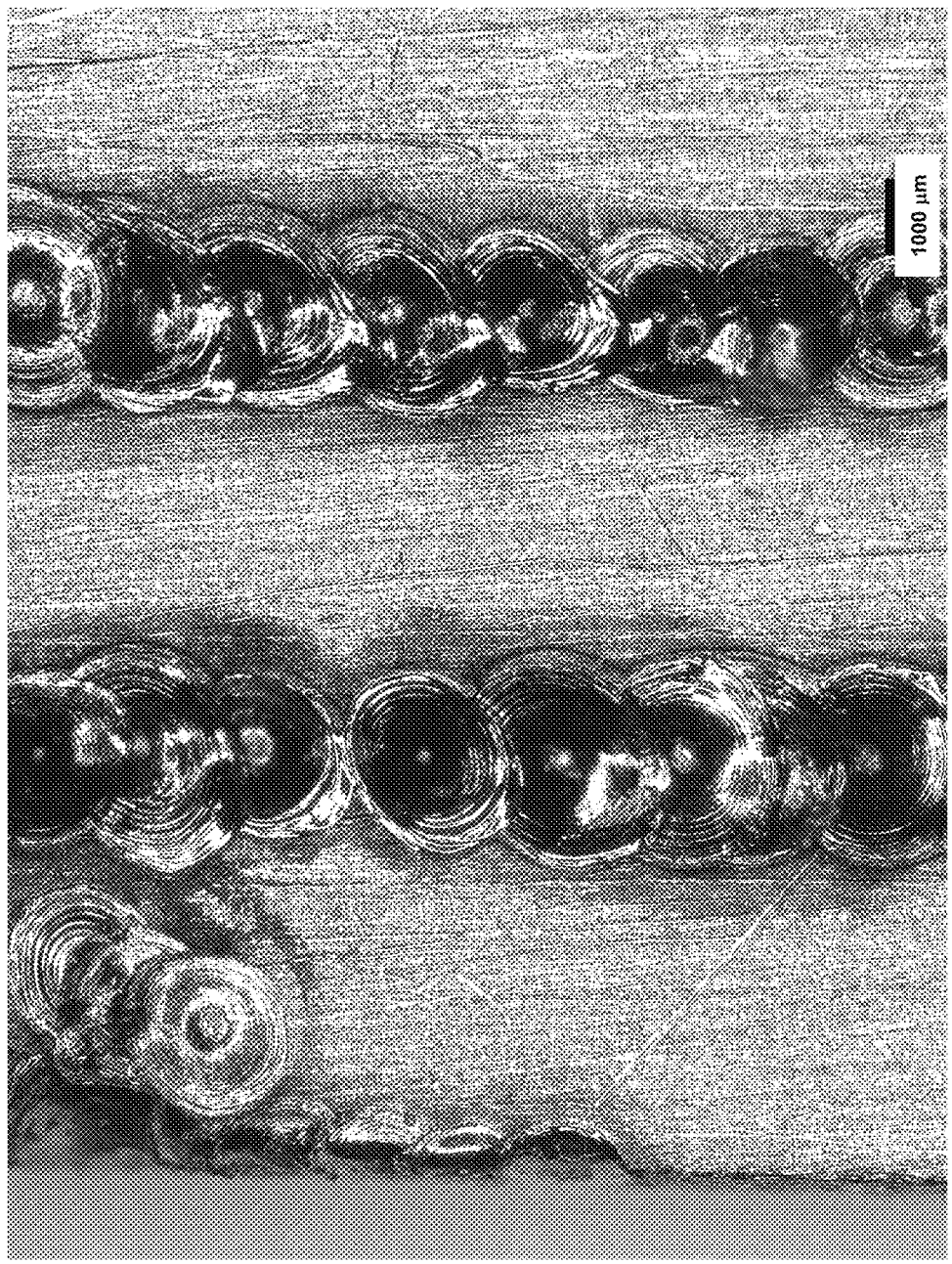
FIG. 7 is a photomicrograph of the FeSi sheet with selective regions of Ni from melted and resolidified Ni foil (scale bar=1000 microns), in Example 1.

FIG. 7 is a photomicrograph of the FeSi sheet with selective regions of Ni from melted and resolidified Ni foil, without an electromagnetic field. The scale bar of FIG. 7 is 1000 microns. FIG. 8A is a micrograph image from a scanning electron microscope (SEM) of a cross section of the Ni foil welded onto the FeSi sheet (SEM scale bar is 200 microns), without an electromagnetic field. In FIG. 8A, the slight color differentiation represents the difference in composition; the lighter area corresponds to a Ni-rich region, while the darker area corresponds to a FeSi-rich region, as illustrated in the SEM image. The Ni is clearly melted into the surface of the FeSi sheet. FIG. 8B is an energy dispersive X-ray spectroscopy (EDS) map showing the different compositions present. The lighter dots represent where Ni is detected, while the darker regions represent where Fe is detected. In the top Ni-rich region, Ni makes up about 65% (atomic basis), while Fe makes up about 32% (atomic basis).

This experiment proves the surface of a magnetic material can be selectively alloyed, eliminating the need for complicated masks.

Example 2: FeSi Magnet with Laser-Melted Cu on the Surface to Selectively Tailor the Magnetic Permeability This experiment utilizes a laser welder chamber. Copper (Cu) foil is laid on top of and wrapped around a FeSi sheet. The FeSi sheet, sized down to a width of about 4.8 millimeters, is placed on a linear actuator. The sample is brought into the focus plane of the laser, which is a YAG (yttrium aluminum garnet, $Y_3Al_5O_{12}$) laser operating at 1064 nm. The laser power is set to 1000 W at a spot size of 200 μm, resulting in an energy density of 0.03 W/μm² at the surface of the sample. The firing speed of the laser is set to 6 Hz so that the sample is carried by the linear actuator under the laser, creating line scans. This technique simulates automated processes with dynamic laser beams such as those found in 3D printers. Line scans are then overlapped to form area scans. As the laser makes contact with the Cu foil, the copper melts into the surface of the FeSi sheet, effectively surface-alloying the FeSi. The copper functions as an austenite-phase-stabilizing material to selectively tailor the FeSi magnetic permeability. This experiment is done without an electromagnetic field.

Figure 9:
FIG. 9 is a photomicrograph of the FeSi sheet with selective regions of Cu (area weld) from melted and resolidified Cu foil (white scale bar=20 microns), in Example 2.

FIG. 9 is a photomicrograph of the FeSi sheet with selective regions of Cu (area weld) from melted and resolidified Cu foil. The scale bar (white) of FIG. 9 is 20 microns.

This experiment proves the surface of a magnetic material can be selectively alloyed, eliminating the need for complicated masks.

Example 3: FeSi Magnet with Laser-Melted Ni on the Surface to Selectively Tailor the Magnetic Permeability Another experiment is conducted similar to Example 1, but utilizing nickel powder rather than nickel foil. The melting and resolidification is achieved using a metal 3-D printer, with no external electromagnetic field applied. A FeSi sheet is placed inside a 3D print chamber, Ni powder is brushed across the FeSi surface, and a laser scans over the area to melt Ni into the FeSi surface.

Figure 10:
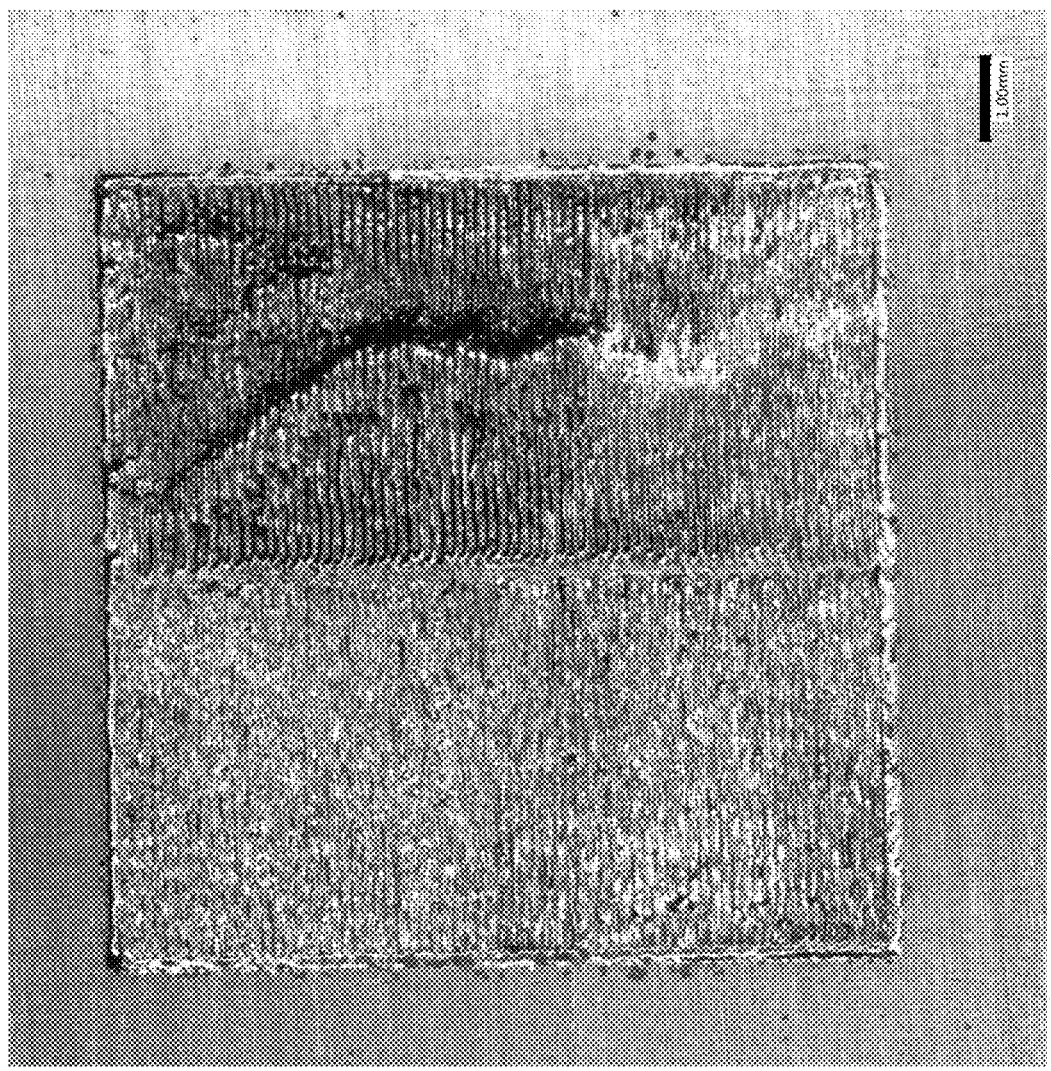
FIG. 10 is a photomicrograph of the FeSi sheet with selective regions of Ni, from melted and resolidified Ni powder (scale bar=1000 microns), in Example 3.

FIG. 10 is a photomicrograph of the FeSi sheet with selective regions of Ni, from melted and resolidified Ni powder. The scale bar of FIG. 10 is 1 millimeter (1000 microns).

This experiment proves the surface of a magnetic material can be selectively alloyed, eliminating the need for complicated masks.

What is claimed is:

1. A soft magnet with surface-tailored magnetic permeability, wherein said soft magnet comprises:
   (i) a first region comprising a first core region and a first surface region, wherein said first core region contains a ferromagnetic material, and wherein said first surface region contains an austenite-phase-stabilizing donor material; and
   (ii) a second region comprising a second core region, wherein said second core region contains said ferromagnetic material, and wherein said second region does not contain said austenite-phase-stabilizing donor material;
   wherein said first surface region has an average thickness from about 50 microns to about 3000 microns;
   wherein in said first region, said average thickness is from about 0.1% to about 50% of a thickness of said first core region, and
   wherein said first region is characterized by a first average magnetic permeability, wherein said second region is characterized by a second average magnetic permeability, and wherein said first average magnetic permeability is higher than said second average magnetic permeability.

2. The soft magnet of claim 1, wherein said ferromagnetic material is selected from the group consisting of FeSi, FeNi, FeCo, NiCo, FeSiAl, and combinations thereof.

3. The soft magnet of claim 1, wherein said austenite-phase-stabilizing donor material is selected from the group consisting of Ni, Mn, Co, Cr, Si, Mo, Nb, Ti, Mg, Cu, Al, N, C, B, and combinations thereof.

4. The soft magnet of claim 1, wherein said average thickness is from about 100 microns to about 500 microns.

5. The soft magnet of claim 1, wherein said first average magnetic permeability is at least 90% higher than said second average magnetic permeability.

6. The soft magnet of claim 1, wherein said first average magnetic permeability is at least one order of magnitude higher than said second average magnetic permeability.

7. The soft magnet of claim 1, wherein said first average magnetic permeability is at least two orders of magnitude higher than said second average magnetic permeability.

8. The soft magnet of claim 1, wherein said soft magnet contains multiple instances of said first region and/or said second region.

9. The soft magnet of claim 1, wherein said soft magnet is present in a rotor in an electric motor.

* * * * *